(12) United States Patent
Liberman et al.

(10) Patent No.: US 12,157,091 B2
(45) Date of Patent: Dec. 3, 2024

(54) FORWARD OSMOTIC AND WATER HAMMER METHOD OF MEMBRANE CLEANING

(71) Applicant: Membrane Recovery Ltd., Even Yehuda (IL)

(72) Inventors: Boris Liberman, Even Yehuda (IL); Igal Liberman, Even Yehuda (IL)

(73) Assignee: Membrane Recovery Ltd., Even Yehuda (IL)

( * ) Notice: Subject to any disclaimer, the term of this patent is extended or adjusted under 35 U.S.C. 154(b) by 385 days.

(21) Appl. No.: 17/589,493

(22) Filed: Jan. 31, 2022

(65) Prior Publication Data

US 2022/0168692 A1 Jun. 2, 2022

Related U.S. Application Data

(63) Continuation-in-part of application No. 15/992,157, filed on May 29, 2018, now Pat. No. 11,291,957.

(51) Int. Cl.
*B01D 61/10* (2006.01)
*B01D 65/02* (2006.01)
*C02F 1/44* (2023.01)

(52) U.S. Cl.
CPC .............. *B01D 65/02* (2013.01); *C02F 1/445* (2013.01); *B01D 2321/04* (2013.01); *B01D 2321/06* (2013.01); *B01D 2321/10* (2013.01); *B01D 2321/168* (2013.01); *B01D 2321/2066* (2013.01); *B01D 2321/2083* (2013.01); *C02F 2303/16* (2013.01)

(58) Field of Classification Search
CPC ............ B01D 2321/04; B01D 2321/06; B01D 2321/2066; B01D 2321/2083; B01D 61/025; B01D 61/10; B01D 65/02; B01D 2313/18; B01D 2321/12; B01D 2321/2033; B01D 2321/2058; B01D 2321/44; B01D 2321/10; B01D 2321/168; B01D 2321/20; B01D 61/002; C02F 1/441; C02F 2103/08; C02F 2303/16; C02F 1/283; C02F 1/444; C02F 1/445; C02F 2103/04; C02F 2301/066; C02F 2303/20; C02F 2303/22; Y02A 20/131
See application file for complete search history.

*Primary Examiner* — Allison G Fitzsimmons
(74) *Attorney, Agent, or Firm* — Fresh IP PLC; Clifford D. Hyra; Aubrey Y. Chen

(57) ABSTRACT

Disclosed herein are apparatuses and methods for semipermeable membrane cleaning. In particular, a pressure retarded osmosis (PRO) process redirects raw solution and fluid streams in such a way as to cause periodic changes of the process from PRO to reverse osmosis (RO) for lifting and detaching fouling. Further disclosed is applying, at least periodically, a pulsed-flow regime in the fluid stream, thereby causing increased shearing force for enhanced evacuation of the foulant. Additionally, a backward wash may be provided by injection, for a predetermined injection time, of additional solution selected in such way that net driving pressure becomes RO opposite to normal PRO operation, thereby providing a backward flow from a first side of the membrane to a second side of the membrane, so as to lift and evacuate foulant.

14 Claims, 5 Drawing Sheets

FORWARD OSMOTIC AND WATER HAMMER METHOD OF MEMBRANE CLEANING

CROSS-REFERENCE TO RELATED APPLICATIONS

The present application is a continuation-in-part of U.S. patent application Ser. No. 15/992,157, filed May 29, 2018, which is a continuation of U.S. patent application Ser. No. 15/328,411, filed Jan. 23, 2017, which is a U.S. National Phase entry of PCT/IB2015/055665, filed Jul. 27, 2015, which claims priority to U.K. Patent Application No. 1414263.2, filed Aug. 12, 2014, and U.K. Patent Application No. 1501243.8, filed Jan. 26, 2015, each of which is incorporated by reference in its respective entirety.

FIELD OF THE INVENTION

The present invention relates to a method and system for cleaning semi-permeable membranes used in Forward Osmosis and Reverse Osmosis processes, such as those implemented in desalination of seawater, brackish water, and wastewater, food processing, pharmaceutical industry, high purity applications, osmotic power generation, waste water treatment, and the like.

BACKGROUND

Semi-permeable membranes become fouled spontaneously during normal operational processes and conditions through the accumulation of fouling media. A fouled membrane has a reduced separability of the dissolved salts, a reduced flux rate, an increased pressure loss and, therefore, has to be cleaned.

Fouling media incudes minerals and organic particles, scaling microcrystals, bacteria, and algae.

All these components are contained in a biofilm matrix made by bacteria. There are no free particles on the membrane surface. All the fouling elements are interconnected by the biofilm. Therefore, fouling is characterized as a layer of interconnected elements laying on a membrane surface as a carpet. In the biofilm matrix exists the most concentrated part of feed solution, which is called and causes Concentration Polarization. In this disclosure, the term "fouling" includes all of the different forms of fouling as mentioned above or known to the skilled man in the art.

The fouling may be located on the feed or the permeate membrane sides. However, most of the fouling is located on the feed membrane side. Due to the membrane structure, the thickness of the fouling biofilm is not equal over the entire surface of the membrane.

A permeate spacer is a grid of solid fibers, defining semi-rectangular void spaces. The permeate spacer is located between the permeate sides of two opposing membrane layers defining a permeate channel. On top of each of such a semi-rectangular void space, there is a free membrane layer portion which may stretch down and displace toward the permeate side, a phenomena called sagging toward the permeate side. This displacement takes place because the gauge pressure on the feed side is higher than the gauge pressure on the permeate side. As a result, under these circumstances, the membrane surface gets a wave-like profile in which valleys caused by sagging are located above the void spaces of the permeate spacer and the hills are located on top of its fibers. Similarly, a feed space is usually located between two opposing feed sides of two opposing membrane layers defining a feed channel. The feed spacer is also a mesh of solid fibers which define void spaces. Typically, the void spaces of the feed spacer are bigger than the void spaces of the permeate spacer. In the present disclosure, "displacement toward the feed side" or "feed forward sagging" means that the displacement toward the permeate side is diminished. In the present disclosure, a membrane may oscillate between a more displaced position (sagged) toward the permeate side and a less displaced position (sagged) toward the permeate side. In a spiral membrane, this wave-like surface dictates a feed flow regime along and across the membrane which enhances the accumulation of more fouling media in the valley areas than in the hill areas. In these valley areas, the longitudinal flow velocity is lower and more fouling media tends to accumulate.

Standard methods for membrane cleaning involve: stopping the RO desalination process; disconnecting membrane modules from the high pressure pump; connecting the membrane modules to a Cleaning In Place (CIP) unit; pumping by a low gauge pressure harsh chemicals along the feed membrane side. This CIP method is expensive, not effective, and creates environmental problems.

U.S. Pat. No. 4,952,317 describes separating colloidal suspension by non-directional, tangential vibration of the membrane elements. This vibration induces the creation of intensive shear forces between the membrane and the colloidal suspension. Such a vibration treats and vibrates the membrane as a whole and does not distinguish between membrane and spacers or between the feed channel and the permeate channel.

This technique has to be applied continuously during the normal operation of the membrane. However, continues vibration application consumes significant power, and accelerates membrane wear and tear. However, as explained above, the nature of the fouling in most of the cases is not of a colloidal suspension nature, but rather a biofilm matrix that behaves as a carpet and/or layer, which tends to be attached to the membrane by adhesion forces. Tangential vibrating of the membrane elements having such a carpet layer of fouling adhered to the membrane surface cannot remove it. Therefore, it is one aspect of the present disclosure to provide a cleaning solution to remove a fouling layer characterized by a carpet structure.

A known reverse osmosis (RO) membrane cleaning method is disclosed in WO2005/123232, which is known as a "DOHS process." This DOHS process teaches the implementation of a cleaning method based on a temporarily inline injection of a Super Saline Solution having a high osmotic pressure into the feed line, so that the Net Driving Pressure across the membrane is locally and temporarily reversed. As a result, the osmotic process over a membrane area switches from a reverse osmosis process to a direct osmosis process. Once the Super Saline Solution propagates downstream the membrane module, the local osmotic pressure regime across the membrane is restored to its original values and the system then switches back to a reverse osmosis process. This procedure is done without stopping the desalination unit, without releasing the gauge pressures in the system, and without inducing membrane sagging. It is mainly the osmotic pressure which is being changed and this cannot cause membrane sagging. The invention further teaches that switching from a reverse osmosis process to a direct osmosis process provides intensive permeate backward flow of permeate into the raw saline solution. The local backward flow of permeate from the permeate side into the feed-brine side may clean the membrane.

Additionally, several patents and patent applications implement gauge pressure pulsation for membrane cleaning, such as U.S. Publication No. 2011/0315612; U.S. Pat. Nos. 7,658,852 (B2); 5,690,829(A); U.S. Publication No. 2012/0318737 (A1); JP 2005238135(A); U.S. Pat. Nos. 3,853,756 (A); and 7,097,769(B2).

The intention of gauge pressure pulsation is to change the process from reverse osmosis in forward osmosis. Generally, a pulse generator is positioned in the feed stream and most of them implement high amplitude of pressure pulsation, such as 30-60 bar. In permeate lines, such big amplitude request implement expensive pipe material and assembly work. Such a large amplitude of pressure charge can be done by gauge pressure changing velocity of not more than 10 psi per second. This means that expected frequency can be very small.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

One aspect of the present disclosure relates to an apparatus and method for an improved membrane cleaning by applying a plurality of directional gauge pressure strokes in the permeate or residual brine stream in order to induce a plurality of membrane feed forward sagging pules/displacements which shakes the membrane mechanically and the fouling biofilm on top of it, during the same period of time when the same membrane area experiences a permeate backward flow induced by a forward osmosis (FO) process.

Embodiments of the present disclosure may be practiced in a normally performed RO process in which fouling is cleaned by injecting into the feed line an additional solution having a higher osmotic pressure than the normal feed osmotic pressure, creating a FO permeate backward flow. The present invention may also be practiced in a FO or pressure retarded osmosis (PRO) process, in which fouling is cleaned by injecting into the feed line an additional solution having a lower osmotic pressure than the normal feed osmotic pressure, creating a RO permeate backward flow. A plurality or set of directional gauge pressure strokes may be created by a generator of water stroke installed in residual brine stream. A set of directional permeate gauge pressure strokes may be created by an external source of pressurized permeate. Such an external source of pressurized permeate may be, for example, a pump, driving permeate from external tank into the permeate enclosure. According to another example, a plurality of directional permeate gauge pressure strokes may be created by a generator of water stroke which is configured to release and stop releasing permeate flow from a permeate enclosure. According to another aspect of the present disclosure, both a pump and a generator of water stroke may operate together, pumping additional permeate into the permeate enclosure and discharging permeate from the permeate enclosure.

One or more embodiments of the present disclosure are applicable to all types and brand names of semi permeable membrane, including Reverse Osmosis (RO), Nano Filtration (NF), Pressure Retard Osmosis (PRO), Forward Osmosis (FO), Direct Osmosis (DO), and other brand name membranes, arranged as Spiral, Hollow-Fiber, Plate & Frame (P&F), and other constructions or builds, from different salt rejection materials already present on the market and novel ones such as zeolite, carbon, nanostructured, mix matrix, etc. All these membrane have a common characteristic: Selective permeability to solvent and solute. These membranes have a common name, specifically "semi-permeable membrane," and in the present disclosure, the term "membrane" includes all those and other known membranes to the skilled man in the art.

Some types of membrane elements such as Spiral and P&F have a permeate spacer. Other types of membranes do not have a support spacer and are self-supported, like Hollow-Fiber. Embodiments of the present disclosure are applicable to spacer-supported and self-supported membranes equally.

In nature, there exists two fundamental processes: Forward Osmosis and Reverses Osmosis processes. In the present disclosure, under the term Forward Osmosis process (FO) are included Direct Osmosis (DO), Osmosis (OS), Pressure Retard Osmosis (PRO), and other known processes to the skilled man in the art in which a common physical phenomena takes place, namely, solvent penetrates from low osmotic pressure solution via a semi-permeable membrane into a high osmotic pressure solution. In such a Forward Osmosis process, the semi-permeable membrane acts as an osmotic pump.

In the present disclosure, under the term Reverse Osmosis (RO) process are included all the processes in which solvent (permeate) is squeezed out from high osmotic pressure solution via a semi-permeable membrane by hydrostatic pressure that is higher than the osmotic pressure of this raw saline solution. In such a Reverse Osmosis process, the semi-permeable membrane acts as a selective barrier.

Membranes usually have a multi-layer structure. A semi-permeable layer is the external layer. In RO applications, the semi-permeable layer is usually oriented toward the feed side. In FO process applications, the semi-permeable layer can be oriented to the feed or the permeate side. Embodiments of the present disclosure may be applicable to each of these configurations equally. There are about 40,000 permeate channels in a typical spiral membrane element, each channel has a typical dimension of an about 0.5 millimeters (mm)×1000 mm.

A permeate channel usually includes a gridded permeate space covered by a semipermeable membrane on both sides, which acts as tight tense drumheads over the void spaces between the grid. The free membrane portions stretch and displace over the void spaces existing between solid support fibers of the permeate spacer. Such a displacement is characterized by an elastic deformation caused due to the differences between the feed gauge pressure, PGr, and the permeate gauge pressure PGp.

As mentioned above, the functionality of such a free membrane portion may be switched from a solute-solvent separator in a RO process to an osmotic pump in a FO process by injecting additional solution into the feed brine channel in order to establish a temporal backward flow across such a free membrane portion. Reversing the net driving pressure across a membrane portion by temporarily switching the osmotic pressure regime is enough to establish a backward flow. Such a backward flow may clean the membrane from fouling. However, since the fouling has the nature of a biofilm layer which sometimes is strongly connected to the membrane layer, such a backward flow in some cases may be insufficient to detach the fouling layer from the membrane layer. Therefore, according to one embodiment of the present disclosure, simultaneously with the establishment of such a backward flow, a gauge pressure manipulating system is configured to create a plurality of directional water strokes, directed from the permeate channel to the feed brine channel or opposite. Preferably, sinusoidal pulsating the feed or permeate gauge pressure enhances the mechanical oscillation of the free membrane portion.

It is another aspect of the present disclosure to synchronize the backward flow established by injection of the additional solution and the gauge pressure stroke, so that the backward flow across the free membrane portion and the feed forward sagging of this free membrane portion coincide. The accumulated effect of the backward flow and the membrane shaking improve the cleaning efficiency process of the membrane.

The propagating speed of the additional solution along the feed brine channel depends on the feed flow, the number of membrane elements in a module, and the number of module stages, etc. The osmotic pressure of the additional solution decreases while it propagates along the membrane elements due to a dilution caused by permeate flow into it. The injection profile, such as duration, volume, or flow rate, of additional solution has to be selected in such a way that the last membrane element in the last module will get sufficient net driving pressure allowing an effective cleaning through backward flow.

According to one embodiment of the present disclosure, a pulse of 3 seconds to 50 seconds of additional solution may be injected into the feed-brine channel while a set of directional water pressure strokes is being generated simultaneously. According to one embodiment of the present disclosure, water pressure strokes may be generated before the injection of an additional solution and may continue several minutes after such an injection, until the system restores its original net driving pressure balance across all membrane modules. According to another embodiment of the present disclosure, residual brine outlet flow may be increased while water pressure strokes are applied. This enhanced brine flow may increase the longitudinal shearing forces along the membrane and further improves the membrane cleaning effect.

According to another preferred embodiment of the present disclosure, periodic oscillations of the pressure difference between PGr and PGp may cause an oscillation of the free membrane portions. As a mechanical system, under the situation of oscillating gauge pressures, the stretched free membrane portion over a void spaces between the solid grids of fibers is in a mechanical state characterized by a forced vibration with damping. As such, the system has a single degree of freedom and therefore at least one natural frequency. However, as mentioned above, the permeate facing side of the membrane is supported by a permeate spacer and the feed facing side of the membrane is supported by a feed spacer. During sagging vibrations, permeate and feed spacers act as a damping system. It is another preferred embodiment of the present disclosure to create gauge pressure strokes having a frequency approximately equal to at least one natural frequency of the system in order to get a resonance and enhanced displacement, and therefore an enhanced cleaning effect. An example of a natural frequency of a brackish water spiral membrane is about 2.5 Hz. Operation in resonance frequency allows by minimum gauge pressure amplitude reach maximum membrane oscillation amplitude, which make cleaning process safer and more cost effective.

Membrane oscillation in a frequency proportional to their natural frequency may increase the amplitude of their vibration (resonance effect). Because the vibrations states in this system are such as with dampers, the spacers' solid fibers will absorb some of the stroke energy. A point will come when the total energy absorbed by theses dampers will equal the total energy being fed in by the gauge pressure oscillation. At this point, the system will reach its maximum amplitude and will continue to vibrate at this level as long as the oscillation force stays the same.

At least one embodiment of the present disclosure implements different approaches of membrane cleaning in variety options of membrane mechanical shaking with and without resonance by means of PGp and/or PGr gauge pressure strokes and combined with reversing osmotic processes from RO to FO.

It is preferable for the mechanical shaking disclosed herein to provide Resonance Membrane Oscillation. This is because the membrane is in contact with feed spacers acting as dampers and, to reach membrane oscillation, the gauge pressure change geometry has to have wave-like smooth sinusoidal form, including half-wave increase and half-wave decrease gauge pressure. A pulse-like feed pressure decrease only, without proportional pressure increase, will not provide the required membrane resonance oscillation. A single pressure decrease or increase is not able to cause resonance. Thus, according to at least one embodiment of the present disclosure, a set of at least several sinusoidal water strokes is preferred to provide the required resonance oscillation.

Furthermore, the positioning of the water stroke generator has to account for the extremely high elasticity of the membrane, small water mass in the membrane, the sensitivity of the feed pump to pressure pulsation, and the presence of a residual brine discharge outlet.

A control valve or other water stroke generator is positioned in the feed stream between the feed pump and the membrane to provide a pressure increase wave in the direction of the feed pump, and a pressure decrease wave in the direction of the membrane. A control valve in the feed stream cannot provide a sinusoidal form of gauge pressure change that includes half-wave increase and half-wave decrease gauge pressure on the membrane.

A water stroke generator positioned to discharge the feed flow out from the RO system, such as in U.S. Pub. No. 2012/318737, also will not be able to provide a sinusoidal form of gauge pressure change. In contrast, a control valve or other water stroke generator positioned in the residual brine stream, as preferred in at least one embodiment of the disclosure, is able to provide sinusoidal form of gauge pressure change that includes pressure increase and pressure decrease half-wave.

It is known to the skilled man in the art that the maximum allowed gauge pressure change velocity is 10 psi/second. However, our research has shown that up to 45 psi/second oscillation will not damage the membrane if the following conditions are fulfilled:

Gauge pressure change geometry has a wave-like smooth sinusoidal form; and

Gauge pressure amplitude is not more than ±3 bar, measured in the feed manifold pipeline to pressure vessels. In some cases, it may be limited to below ±5% of the normal operation range.

In at least one embodiment of the disclosure, the feed and/or permeate gauge pressure pulsation are small, and are not intended to change the process from reverse osmosis to forward osmosis. However, in at least one embodiment of the present disclosure, the process may be changed from RO to FO by changing osmotic pressure reached via injecting of Additional Solution. This differs from further embodiments wherein the process is changed from RO to FO by permeate throttling until reaching a zero value of NDP (see below herein). With the injection of Additional Solution, the change in osmotic pressure may be significant, such as, for example, 100 bar. The velocity of osmotic pressure change can be very fast with no risk of membrane damage. The combination of providing a small gauge pressure change with a large osmotic pressure change allows one to reach concurrently membrane resonance oscillation by high frequency without risk of membrane damage with simultaneous backward flow, without the need to use expensive high pressure permeate piping material.

A fouling carpet layer may be attached to membranes by adhesion and other physical forces. In order to effectively clean the membrane, these forces should be overcome. Moreover, fouling, contrary to the membrane, is transparent to the gauge pressure, and under normal operation it experiences no tensile stress and, therefore, it is not stretched. In addition, the fouling biofilm layer is characterized by low elasticity and a relatively short plastic deformation transition state before it breaks and ruptures. Therefore, the two interconnected layers, the elastic membrane and the attached plastic biofilm, may be considered as two connected membranes system each having different mechanical features. Moreover, the specific weight of the membrane is bigger than the specific weight of the biofilm. Differences in specific weights causes result in different acceleration per pressure stroke. This different response may contribute to the detachment and rupture process of the biofilm and the cleaning process of the membrane. It is another aspect of the present disclosure to utilize these differences to enhance the separation of the fouling biofilm carpet from the membrane.

In order to detach the plastic biofilm fouling layer from an elastic RO membrane, the geometry of the elastic membrane has to be changed sharply. Such a change may be done by changing rapidly PGp or PGr by a water pressure stroke. Since the plastic biofilm fouling layer is transparent to changes in gauge pressures, it will lag behind the elastic membrane. The plastic fouling biofilm layer will follow the elastic membrane geometry changes only due to the adhesion forces between them. Fast and frequent geometry changes of the elastic membrane due to sagging and displacement caused by the water pressure stroke may create tensile stress between the two connected membranes along their connection area and gradually open a gap between the elastic and the plastic membranes and will eventually detach them.

The pulsed water stroke may act as a hammer which directionally hits and mechanically shakes the membrane in a sequence of pulses characterized as a wave of pressure surge. The pulse water stroke may be generated by, for example, by a quick water's momentum change, such as when flowing water are forced to rapidly stop or start or change its direction of flow. A pulsed water stroke may occur when a valve is closed or opened quickly at the end of a pipeline system, and as a result a pressure wave propagates along the pipe toward membrane module. Alternatively, the pulsed water stroke phenomenon may be initiated by a quick start or stop of a running pump delivering water into the line.

Pressure stroke waves can travel in and along the line as fast as the speed of sound in the relevant water media and may reach all parts of the membrane module. A plurality or set of strokes may displace the free membrane portions over the void spaces of the relevant spacer creating tensile stress in and along the fouling biofilm, breaks it, and detaches it from the membrane.

Quick alternation of gauge pressures PGp and/or PGr (pressure waves) may provide rapid and sharp membrane "shaking," resulting in an effective membrane cleaning.

Pressure waves may be generated selectively and separately on PGp and/or PGr. Selective generation of pressure waves over and on top of the gauge pressures of the permeate and/or feed may create directional pressure strokes across a free membrane portion having a feed-to-permeate or a permeate-to-feed direction, respectively. The generator of the water strokes may be located in a distance from membranes and still be effective. The generator of the water strokes is preferably located in the residual brine outlet or along the permeate inlet/outlet streams. Multiple water stroke generators may be connected to a single RO system. Multiple water stroke generators may be operated together, separately, and/or in sync in order to create oscillations in feed-brine or permeate gauge pressures.

In one embodiment, a water stroke generator is positioned along the permeate and/or residual brine stream. Positioning a water stroke generator along the permeate and/or residual brine stream is an important advantage because of the distance from the feed pump, which is sensitive to pressure pulsation. There are thousands of displaceable free membrane portions between the feed pump and the water stroke generator, which absorb and damp the pressure pulsation before it reaches the feed pump. These free membrane portions accumulate energy in these elastic deformation, when the valve on residual brine discharged is closed, and give it back when valve on residual brine discharged is open. Such mechanism of kinetic and potential energy exchange cannot work when pressure pulse generation valve is positioned in the feed stream.

The water stroke generator may be configured to control the amplitude and the frequency of strokes. The water stroke generator may be configured to generate strokes in different frequencies, including frequencies proportional to the natural vibration frequency of the membrane base unit (The "membrane base unit," as used in this application, refers to the basic vibrating element described above which includes a single void space covered by a free membrane portion). Water stroke generator may be configured to produce multiple frequencies. Multiple frequencies pressure waves may cause a resonance effect in a variety of basic unit sizes, enhancing biofilm fouling detachment effect.

The resonance point or area may be determined by smooth tuning of the pressure pulsating frequency between 0.1 and 5 Hz for present, on the market, membrane material. Novel membrane material, such as zeolite, carbon, nano-structured, mix matrix that will come on the market, may have other resonance frequency. Resonance achievement is visible as an abrupt increase in turbidity of residual brine. The pulsating frequency has to have variation in certain range as different parts of the membrane may have different resonance point. Simultaneous but different frequency may be applied to PGp and PGr to reach abrupt increase in turbidity of residual brine. A single gauge pressure pulse may not able to cause membrane resonance oscillation. A set of a few tens of gauge pressure pulses may be required. In some heavy fouling applications, gauge pressure pulsation can be applied permanently, and additional solution applied periodically with intervals of a few hours.

The process of pulsating FO backward flow may be provided by changing Net Positive Suction Head (NPSH) of an osmotic pump. This effect may be reached by changing PGp water strokes in frequency from about 0.02 to 0.1 Hz and amplitude about ±4 bar. Simultaneously via PGr water strokes may be applied resonance membrane oscillation each one by different frequency and amplitude.

A "Permeate Enclosure" comprises permeate channels, permeate tubes, pipelines, and other equipment that are all in a fluid communication. Any sharp change in the amount of fluid within the enclosure, whether increasing or decreasing, will result in an increased or decreased of its gauge pressure respectively and will generate a pulsed water stroke. The pulsed water strokes may provide several momentum changes in gauge pressures PGp and/or PGr based on different embodiments of the present disclosure. According to one embodiment, a pulsed water stroke may be generated by adding a pulse of excess permeate flow into the permeate enclosure from an external permeate source by a pump. Such a pulsed water stroke may also be generated by a pulse wise increase-decrease of out flow leaving the permeate enclosure using a generator of water stoke.

Adding permeate flow, whether continuously or pulsed, from an external source through a pump into the permeate enclosure may be combined with a simultaneous subtraction of permeate out flow from the permeate enclosure. Such a permeate flow subtraction may also be in the form of pulsed provided by water stroke generator. An example of water stroke generator may be a Pressure Relief Valve (PRV) that includes plug and pressure adjustable string. Such a combination of pump and PRV may provide two effects simultaneously. The first effect is that there will be sufficient supply of permeate to PRV for pulse generation. This excess in-flow supply, once suddenly stopped by the PRV, will generate a half-wave pressure increase. The second effect is that a sufficient amount of permeate flow with required pressure will be supplied to the osmotic pump which generates the membrane backward flow.

Such an arrangement may be configured as known to the skilled man in the art to generate a directional-pulsed water stroke in a single frequency or in a multiple of frequencies, randomly, independently, or synchronically.

A pulsed water stroke may also be generated by an ultrasound generators configured to deliver ultrasound waves onto, and into, elements of the permeate enclosure. Pulsed water stroke may also be generated by an external piston moving in and out the permeate and/or residual brine line causing liquid volume changes in the line which in turns generate pressure water strokes. Pneumatic, hydro, or electrical shock wave generators may also be used to generate such pulsed water strokes. A pulsed water stroke may be generated by and in many different forms, as known to the skilled man in the art.

A solution which enters the feed channel and flows along the feed side of the membrane is termed herein as a "Raw Saline" (RS) solution. A solution which leaves the feed channel of the membrane is termed herein as a "Residual Brine (RB)." The RS solution which flows between the inlet and outlet ports of the feed channel, and has an osmotic pressure POr and a gauge (hydrostatic or monomeric) pressure PGr.

A solution which flows on the permeate side of the membrane is termed herein as a "Permeate (PR)." The PR has an osmotic pressure POp and a gauge pressure PGp.

As thought by WO2005/123232 termed "DOHS Process" Additional Solution (AS) with osmotic pressure POs>POr may be fed into the feed channel of the membrane for a predetermined injection time. Such an injection will reverse the process across the membrane from a RO to a FO process and back to RO fast. In the same time on the same membrane and under the same gauge pressure, RO and FO processes may take place simultaneously on adjacent portions of the membrane as the AS pulse propagates downstream. This short AS injection generates a short but strong permeate backward flow across the membrane.

A balance of forces across a membrane portion will dictate whether it experiences an FO or a RO process. Four forces are involved in this balance across a membrane portion from both the feed side and the permeate side. This balance is called Net Driving Pressure (NDP). This NDP may further be termed as NDP-FO for a Forward Osmosis process or NDP-RO for a Reverse Osmosis process.

$$NDP(FO\ or\ RO)=PGr-POr-PGp+POp, where:$$

POr and PGr are the osmotic and gauge pressures of the RS solution, and POp and PGp are the osmotic and gauge pressures of the PR solution.

If the balance of these four forces across a specific membrane portion is positive (+), the process is called Reverse Osmosis NDP-RO and PR is squeezed out from RS solution via the semi-permeable membrane.

If the balance of these four pressures across a specific membrane portion is negative (−), the process is called Forward Osmosis NDP-FO and PR is sucked into the RS solution via the semi-permeable membrane. Injection of AS instead of RS may switch the osmotic process across the membrane from a RO to an FO or vice versa, depending on the new balance of the net driving pressure that will be reached with this AS injection. According to one aspect of the present disclosure, injecting the AS may be done as a full replacement of the entire RS flow or by mixing AS and RS together before their entrance into the feed channel. The effective osmotic pressure of the AS or the mix of the AS with the RS dictates the osmotic pressure POs on the feed side of the membrane.

The practical implementation of an FO process shows that sagging does not take place due to sharp changes in osmotic pressure. Osmotic pressure applies only to water molecules and cannot change membrane's geometry. A sharp change of an osmotic pressure may change the direction of flow from a RO to an FO, but is incapable of changing membrane shape and cannot cause membrane delamination and damage. It is absolutely safe for membrane integrity to undergo a momentarily high amplitude change of osmotic pressure, in contrast to a rapid and high amplitude change of gauge pressure that may cause membrane distraction.

According to one embodiment of the disclosure, combining FO backward flow and a pulsed water stroke that mechanically shakes the membrane at the same time instant provides a synergetic result which improves fouling removal effectiveness. There are several possibilities to practice it. Two of these possibilities will be discussed herein as non-limiting examples.

According to one embodiment of the present disclosure, synchronizing pulsations of FO backward flow and pulsed water stroke (mechanical membrane shaking) may have an additional benefit over continuous FO backward flow and a pulsed water stroke. In such a pulsating FO backward flow regime, a smaller volume of permeate crosses the membrane. Therefore, the AS pulse is less diluted during its propagation downstream along the membrane. To say it in other words, the higher and the longer duration the AS concentration lasts, the stronger the negative driving pressure, the stronger the backward flow and the cleaning effect. In addition, keeping the AS concentration less diluted enables using lower initial AS osmotic pressure POs or shortening its injection time while keeping the same cleaning effect. According to one aspect of the present disclosure, sacrificing permeate as backward flow for cleaning purposes should be made simultaneously with a pulsed water stroke causing free membrane mechanical shaking toward the same direction. Time and directional synchronization between permeate backward flow and mechanical membrane shaking will enhance the effect of fouling separation and may consume less AS and less permeate. The membrane cleaning process according to this embodiment of the disclosure is based on mechanical forces rather than chemicals. As such, it is another aspect of the disclosure to offer an environmentally friendly solution.

In an alternative embodiment of the present disclosure, mechanical shaking of the free membrane portions to detach foulant is again carried out by applying, for a predetermined period of time, a plurality of directional pressure strokes PGp and/or PGr on the permeate and/or residual brine membrane side. In addition, a pulse-wise flow regime is applied in the residual brine stream to increase the shearing force to the membrane thereby achieving enhanced fouling evacuation. In this embodiment, no additional solution is required and the process may be carried out during the normal RO procedure.

In this embodiment, the pressure strokes are precisely synchronized with flow pulsation. Precise synchronization is applied between peaks of pressure strokes and peaks of pulse-wise flows in a separation module, thereby achieving simultaneous enhanced flip foulant up and its evacuation by increasing shearing force. The generator for purpose of precise synchronization of gauge pressures strokes and/or flow pulse, comprises a piston or other similar means, such as a diaphragm, each side of which is in flow communication with separation module inputs and/or outlets synchronization of which is requested.

As a non-limiting preferable example, precise synchronization may be applied in the following alternating sequence: PGr pressure decreasing, shearing force increasing; PGp increasing; followed by PGr pressure increasing, shearing force decreasing, PGp pressure decreasing, thereby providing synergetic enhancement of fouling detachment and evacuation. The required cleaning effect is achieved when the free membrane portions shaking provided by residual brine gauge pressure PGr sharp decrease is precisely synchronized with permeate gauge pressure PGp sharp increase and precisely synchronized with residual brine flow velocity increase. This may be achieved by connecting the water generator to a 3-way valve connected to the residual brine stream, permeate stream and to drain. The 3-way valve may switch the water stroke generator between two positions to provide the required sequence, as follows:

Position 1: The 3-way valve opens brine flow to a water stroke generator causing PGr decrease, shearing force increase, and permeate pressure PGp increase; and Position 2: The 3-way valve closes brine flow and connects the water stroke generator to drain, causing PGr increase, shearing force decrease, and PGp decrease.

In this aspect of the present disclosure, an additional cleaning activity may be carried out at intervals, comprising a periodic osmotic backwash (POB), which may be performed with or without oxidation.

The periodic osmotic backwash is based on high frequency (e.g., several times a minute) changes from Reverse Osmosis (RO) to Forward Osmosis (FO). This is brought about without feeding of Additional Solution to the feed side of the membrane, but rather involves reaching neutral value of NDP by glide changing PGp and/or PGr combined with extremely fast and precise synchronized changes of the residual brine and permeate gauge pressures; decrease PGr, increase PGp, and vice versa. In this respect, the process changes from RO to FO when the sign of net driving pressure, defined by the balance of osmotic and gauge pressures PGr, POr, POp, and PGp, changes. Glide changing PGp and/or PGr until a neutral value of NDP may be done in several ways by throttling permeate outlet, feed flow input, residual brine outlet, or some of the aforementioned. A preferable option is throttling permeate outlet as this is the simplest from a practical point of view.

In an alternative embodiment, the quick back and forth movement of permeate across the membrane caused by changing the process between RO and FO as described above is enhanced by the inclusion of a strong oxidizing agent. This involves the additional step of injecting cleaning solution into the permeate enclosure, preferably before the permeate throttling step.

First Example: Continuous FO Backward Flow and Pulsed Water Stroke (Mechanical Membrane Shaking)

A combined, continuous FO backward flow and pulsed water stroke method for cleaning a semi-permeable membrane in a reverse osmosis separation module may be made in the following way. A membrane has a feed and a permeate side facing a feed channel and a permeate channel respectively. Foulant is mainly located on the feed side. The membrane normally performs Reverse Osmotic Process producing desalinated water (permeate). A RO process may take place in the following way: feeding a saline solution under gauge pressure PGr and an osmotic pressure POr, removing residual brine from the membrane feed side. Permeate having gauge pressure PGp and osmotic pressure POp penetrates from feed side to permeate side accordingly to a net driving pressure defined by the balance of the pressures PGr, POr, POp, and PGp.

A membrane cleaning session is conducted in the following way: Feeding the feed side of a membrane, for a predetermined injection time, Additional Solution having an osmotic pressure POs>POr chosen in such a way that the net driving pressure becomes opposite to the normal operation, whereby a backward flow of permeate is induced, so as to lift and remove foulant. At the same time, a set of pulsed water strokes is applied to cause a mechanical membrane shaking, so as to enhance the lift and removal of said foulant by superposition of hydraulic and mechanical forces. Such set of water strokes may be provided by a water stroke generator positioned in the residual brine stream and/or permeate stream.

Second Example: Synchronization Between Pulsating FO Backward Flow and Pulsed Water Stroke (Mechanical Membrane Shaking)

This phenomenon of strong permeate flow pulsation during osmotic backward flow is related to a Net Positive Suction Head (NPSH) of an osmotic pump. According to one aspect of this embodiment, in order to take greater advantage of the osmotic backward flow, it has to work in a pulsed flow regime, synchronically with the mechanical membrane shaking caused by the pulsed water stroke. An osmotic pump is NPSH-dependent, similar to a conventional centrifugal pump. The "required NPSH value" for a centrifugal and osmotic pump is defined as the minimal suction pressure, below which the pump is unable to deliver expected flow even if the motor rotates at full power.

The NPSH value for the osmotic pump is PGp. There is a minimum permeate pressure PGp, the "required NPSH value," below which osmotic pump is unable to deliver flow even if the osmotic pressure of Additional Solution, POs, across the membrane is very high. The semi-permeable membrane layer acts, in this regard, as the impeller of an osmotic pump.

This PGp is a function of the hydraulic pressure losses in common permeate piping, central permeate tubes, and tight permeate channels. The membrane support layers themselves also contribute to some permeate pressure losses.

If the PGp is above the "required NPSH value," the osmotic pump is able to push flow of permeate proportional to NDP-FO. If PGp is below the "required NPSH value," the osmotic pump is unable to deliver permeate flow. In the text below herein, we will use the term "NPSH" instead of "required Net Positive Suction Head value."

According to another embodiment of the present disclosure, the pulsed permeate water stroke may provide PGp pressure fluctuations below and above the NPSH. In such a way, the pulsed pressure water stroke becomes the triggering switch which enables the alteration of the osmotic pump flow. Since osmotic pumps do not have massive inertial parts, their flow changes from a minimum to a maximum flow take place immediately.

This combination of mechanical membrane shaking and permeate backward flow pulse of osmotic pump may be synchronized in time and direction.

Pulses of permeate backward flow may be applied exactly in these milliseconds when membrane is in its maximum amplitude of shaking. Any gap that occurs due to such shaking between the membrane and the fouling may be filled by the permeate flow. Such permeate penetration between the membrane and the fouling further decreases the adhesion forces existing between membrane and the fouling, and further causes fouling carpet rupture and detachment.

Experimentally it was found that, for brackish spiral RO membranes that are presently on the market, the NPSH during Forward Osmotic & Water Stroke (FO&WS) cleaning can be reached when the permeate pressure PGp in a common permeate pipe line is about 3 bar gauge. To provide pulses of permeate backward flow during a forward osmosis process, the PGp may be changed from vacuum value (−1) to 7 bar; in other words, it is ±4 bar amplitude. For other types of membrane, this value has to be found experimentally as the pressure which provides the most effective cleaning. For new carbon and nanoparticles membranes, which may be commercially available soon, it is expected that their NPSH will be diminished due to lower hydraulic loss associated with permeate movement via membrane. Significant hydraulic losses are associated, however, with hydrophobic feathers of their support layer. Treatment of such membranes by a Polydopamine or similar solution, which makes the membrane's support layers hydrophilic, may further increase the effectiveness of the cleaning methods thought by this disclosure, or diminish the amount of AS required. Alternatively, adding Polydopamine or a similar solution which makes the support layer of such membranes more hydrophilic before or during the Additional Solution may increase the effectiveness of embodiments of the present disclosure. Such a solution may be, for example, alcohol. Alcohol or a similar solution may be added before or during the injection of AS. Alternatively, it can be added into the feed line in a RO processes or into the permeate line in an FO processes. This technology is expected to be most effective in the food processing, pharmaceutical, and semi-conductors industry.

Additional aspects of this disclosure may increase the membrane cleaning effect by increasing osmotic coefficient or activity coefficient of the additional solution. As known to the skilled man in the art, that osmotic pressure depends on the activity coefficient and the activity coefficient is related to the diffusion coefficient. Therefore, the higher the activity and the diffusion coefficients, the higher the osmotic pressure of the same solution concentration.

According to another embodiment of the present disclosure, water may be treated by a magnetic, an electromagnetic, or a microwave filed in order to reduce the size of water clusters and break the hydrogen bonds structure of the water molecules in the aqueous electrolyte solution.

Water mixed with dry salt for the on-site preparation of the additional solution may be magnetically treated to have increased osmotic, diffusion, and activity coefficients, due to the water smaller clusters, reaching a higher osmotic pressure POs value. According to another aspect of the present disclosure, a permanent magnet may be positioned in the water tank where dry salt dissolving process takes place. According to this embodiment, the solution has to circulate under the magnetic treatment field several times during the dissolving process in order to achieve an effective water clusters break. Therefore, according to another embodiment of the present disclosure, the Additional Solution may be circulated under the influence of such a magnetic field just before the time in which it is injected into the feed channel.

According to another embodiment of the present disclosure, the Additional Solution is actually Draw Solution implemented in FO and PRO processes. A magnetic treatment, as mentioned above, of this Draw Solution may increase its activity coefficient and therefore its actual effectiveness by an increased osmotic pressure.

This increase in actual effective osmotic pressure of the AS is ecologically important because less AS solution may be required for the same effectiveness level of membrane cleaning.

The self-diffusion coefficients of the Na+ and Cl− ions in 5 M (mole) concentration (Additional Solution base on NaCl) may be increased by about 17% to 25% as the magnetic field strength increases from 0.5 Tesla to 2 Tesla.

Embodiments of the present disclosure may impact the entire scheme of water treatment and may allow the production of higher water purity.

At least one embodiment of the present disclosure may allow avoiding the commonly used practice of chlorination, e.g. chloramine, in a pretreatment process in a RO module. The absence of chlorination pretreatment prevents the formation of chlorination by-products such as trihalomethanes and the risk of semipermeable membrane oxidation. Current RO modules are unable to reject small size organic molecules such as, for example, pharmaceutical, pesticides or hormones. TOC measurements done on the permeate products of existing RO systems detect about 100 ppb of such organic matter which passes the RO membranes. Removal of this organic material in the presence of chlorination by-products is less effective. By avoiding such by-product, as at least one embodiment of the current disclosure allows, enables effective implementation of an ultra-filtration (UF) module positioned downstream of the semipermeable membrane in a configuration which is known to the skilled man in the art for conduction batch absorption. A UF module installed on the permeate side, downstream the RO module, may be available to capture this organic material. Activated carbon is one non-limiting example for a sorbent that may be used in an UF as batch or online absorber. Sorbent may be dosed into the feed stream of a UF module in the beginning or during of each filtration cycle. The UF module acts as an absorber vessel in which external mass transfer and surface diffusion take place between sorbent and organic material.

Third Example: Precise Synchronization Between Pulsed Water Stroke (Mechanical Free Membrane Parts Shaking) with Flow Pulsation In yet another embodiment of the present disclosure, mechanical shaking of the free membrane portions to detach foulant is again carried out by applying, for a predetermined period of time, a plurality of directional pressure strokes PGp and/or PGr on the permeate and/or residual brine membrane side. In addition, a pulse-wise flow regime is applied in the residual brine stream to increase the shearing force to the membrane thereby achieving enhanced fouling evacuation. In this embodiment, no additional solution is required and the process may be carried out during the normal RO procedure.

In this embodiment, the pressure strokes are precisely synchronized with flow pulsation, preferably in the alternating sequence: PGr pressure decreasing, shearing force increasing; PGp increasing; followed by PGr pressure increasing, shearing force decreasing, PGp pressure decreasing, thereby providing synergetic enhancement of fouling detachment and evacuation. The required cleaning effect is achieved when the free membrane portions shaking provided by residual brine gauge pressure PGr sharp decrease is precisely synchronized with permeate gauge pressure PGp sharp increase and precisely synchronized with residual brine flow velocity increase. This may be achieved by connecting the water stroke generator to a 3-way valve connected to the residual brine stream, permeate stream and to drain. The 3-way valve may switch the water stroke generator between two positions to provide the required sequence, as follows:

Position 1: The 3-way valve opens brine flow to water stroke generator causing PGr decrease, shearing force increase, and permeate pressure PGp increase; and Position 2: The 3-way valve closes brine flow and connects water stroke generator to drain, causing PGr increase, shearing force decrease, and PGp decrease.

Fourth Example: Precise Synchronization Between Pulsed Water Stroke (Mechanical Free Membrane Parts Shaking) with Flow Pulsation and Pulsating Osmotic Backwash RO-FO-RO (with or without Oxidation)

In at least one embodiment of the present disclosure discussed in the fourth example, an additional cleaning activity may be carried out an intervals, comprising a periodic osmotic backwash (POB) which may be performed with or without oxidation. This activity is made on-line without stopping the feed pump, with very limited interruption in the normal desalination process.

The periodic osmotic backwash is based on high frequency (e.g., several times a minute) changes from Reverse Osmosis (RO) to Forward Osmosis (FO). This is brought about without feeding of Additional Solution to the feed side of the membrane, but rather involves extremely fast and precise synchronized changes of the residual brine and permeate gauge pressures; decrease PGr, increase PGp, and vice versa. In this respect, the process changes from RO to FO when the sign of net driving pressure, defined by the balance of osmotic and gauge pressures PGr, POr, POp and PGp, changes.

Thus, the periodic backwash procedure (POB) adds an additional step of throttling permeate exiting from permeate enclosure, and increasing permeate gauge pressure PGp until the NDP value become equal to zero. In a non-limiting numerical example, PGp increases from 1 bar to 9.1 bar.

NDP(Neutral)=+12−3−9.1+0.1=0.0 bar

Precisely synchronized directional strokes with opposed directed change of pressure: PGp (between 11.5 and 12.5 bar) and PGr (between 9.6 and 8.6 bar) providing a plurality of quick RO-FO-RO process changes.

NDP(FO)=+11.5−3−9.6+0.1=−1.0 bar. The sign (−) means the process is FO.

NDP(RO)=+12.5−3−8.6+0.1=1.0 bar. The Sign (+) means the process is RO.

In an alternative embodiment, the quick back and forth movement of permeate across the membrane caused by changing the process between RO and FO as described above is enhanced by the inclusion of a strong oxidizing agent. This involves the additional step of injecting cleaning solution into the permeate enclosure, preferably before the permeate throttling step. PO&OB may be implemented for membranes such as, for instance, graphene, zeolite, carbon, ceramic, nanostructured, mix matrix, etc. that are able to withstand a high concentration of strong oxidizers.

In this embodiment, a preferred sequence of steps is as follows:

Step 1: Cleaning solution is injected in one side of permeate enclosure and fills it up, when the separation module is in normal RO operation.

Step 2: Throttling permeate exiting from the permeate enclosure. Reaching NDP (Neutral).

Step 3: The 3-way valve in Position-1 opens brine flow to water stroke generator, causing: PGr decrease; and PGp increase. Process changed from Reverse Osmosis to Forward Osmosis. Backwash by permeate takes place and fouling evacuation by high shearing force. (Fouling oxidizes or dissolves option PO&OB.)

Step 4: The 3-way valve in Position-2 closes brine flow and connects water stroke generator to drain. PGr increasing due to water hammer caused by sudden valve closing; permeate pressure PGp decreasing, caused by sudden opening brine side of wafer stroke generator to drain; and shearing force in feed membrane side deceasing. Process changed from Forward Osmosis to Reverse Osmosis. Permeate goes back to permeate area. In the PO&OB option, chemical solution filters itself by this back movement via membrane.

Steps 3 and 4 are repeated frequently, causing a "back and forth" dozens of times backwash and, optionally, dozens of fouling oxidation or scaling dissolution.

Step 5: Cleaning solution moves back to storage tank for re-concentration and reuse.

Step 6: Permeate enclosure opens by valve and begins normal RO operation.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIGS. 1, 1B, and 1C are schematic and expanded views of a RO system, according to at least one embodiment of the present disclosure.

DETAILED DESCRIPTION

Figure 1:
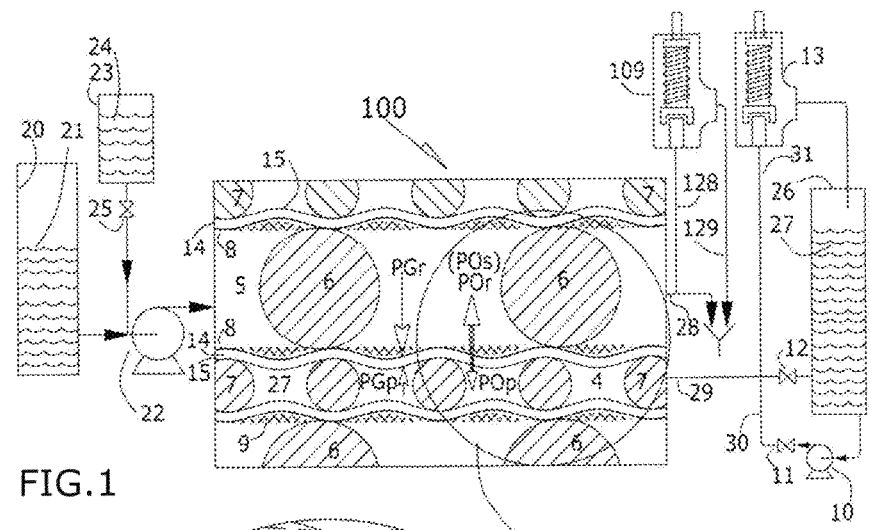

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

As used herein, ranges are used herein in shorthand, so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including" and the like are used herein, the phrase "and without limitation" is understood to follow unless explicitly stated otherwise.

FIG. 1 is a schematic view of a RO unit comprising a reverse osmosis (RO) separation module 100. Tank 20 contains Raw Saline solution (RS) 21. Tank 23 contains additional solution 24. Feed pump 22 pumps raw saline solution into a feed channel 5 and toward a membrane feed side 8. Raw saline solution which comprises a solvent and dissolved salts, moves along the membrane feed side 8 under gauge pressure PGr and has an osmotic pressure POr. Residual brine is removed via outlet (RB) 28.

Semi-permeate membrane 14 has a feed side 8 and a permeate side 15. Feed spacer 6 maintains a gap between two opposing feed sides 8 of two opposing membranes 14 and defines the feed channel 5. During a RO separation process, permeate (PR) 27 has an osmotic pressure POp and a gauge pressure PGp, and is driven by a positive net driving pressure defined by the balance of the four pressures PGr, POr, POp and PGp, and penetrates via membrane 14 into the permeate channel 4 which is shown in detail in FIG. 1C.

Figure 1B:
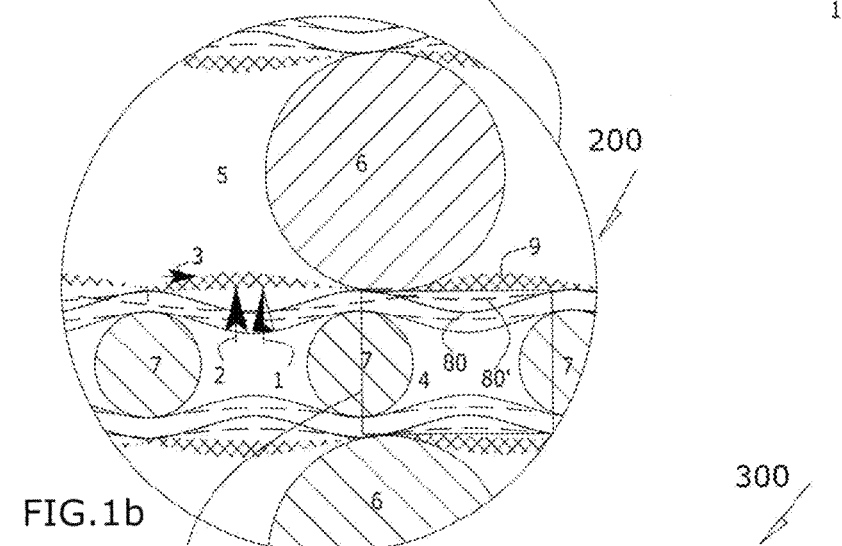
Figure 1C:
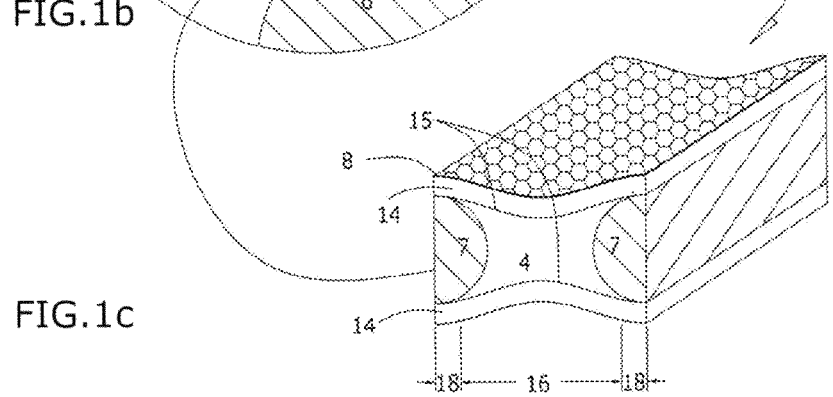

Basic unit 300 in FIG. 1C is defined by a pair of adjacent solid permeate spacer ribs 7 which maintain gap 4 between two opposing permeates sides 15 of two opposing free membrane portions 16 of membrane 14. As mentioned above, membrane 14 tends to get a wave-like geometry due to a higher PGr than PGp and due to the mechanical support provided by the grid of the rigid ribs of the permeate spacer 7.

A typical spiral membrane element may have about 40,000 basic units. A basic unit 300 may have a dimension of an about 0.5 mm in width and 1,000 mm in length. A drumhead of a stretched membrane over a void space 4 of the permeate channel consists of stretched free membrane portion 16 located between two opposing solid fibers of permeate spacer 7. According to at least one embodiment of the present disclosure, periodic oscillations of the pressure difference between PGr and PGp cause an oscillating displacements of free membrane portions 16.

As shown in FIG. 1B and FIG. 1C, membrane 14 and free membrane elements 16 may be displaced from a first position 80 to a second position 80'. It is one aspect of the present disclosure to induce such displacements by changing the ratio between PGr and PGp temporarily, in a synchronized way or in an unsynchronized way, in a way which may cause a quick pulsed displacement characterized by a certain direction. Such a direction is preferably from the permeate channel toward the feed channel.

Due to the wave-like geometry of membrane 14, as mentioned above, flow of the raw solution in the feed channel experiences velocity changes. The feed flow velocity tends to be higher in narrow spaces in feed channel 5, such as the spaces above the solid ribs 7 of the permeate spacer which gives no room to membrane 14 to bend (sag) toward the permeate channel. These areas are characterized as supported membrane portions 18 which has no room to bend (sag) toward the permeate side. The feed flow velocity tends to be lower in wider spaces of the feed channel 5, such as in the feed channel spaces located above void permeate channels spaces 4 which has no rigid support. Such places are characterized by free membrane portions 16 which have room to be displaced and bend (sag) toward the permeate side and toward the feed side, as a function of the ratio and/or changes of this ratio, of the PGr and PGp. Moreover, due to these changes of feed flow velocity, and due to other factors, in general fouling 9 tends to be thicker above free membrane portions 16 and thinner above supported membrane portions 18.

As shown in FIG. 1B, feed spacer 6 and permeate spacer 7 maintain gaps between opposing membranes. Gap 5 between two opposing feed sides 8 of two opposing membranes 14, in which feed spacer 6 is located, is defined as the feed channel 5 and it is in a fluid communication with feed pump 22 and residual brine outlet 28. Gap 4, which is located between two opposing permeate sides 15 of two opposing membranes 14, in which permeate spacer 7 is located, is defined as the permeate channel and it is in a fluid communication with permeate pipe 29.

As shown in FIG. 1, permeate channel 4 is in fluid communication with tank 26 contains permeate 27 through valve 12, and pipeline 31 with pressure relief valve 13 and pump 10 with valve 11. An arrangement, for example, such as pump 10, valve 11 and a pressure relief valve 13 may be configured to create a pulsed water stroke of an increased PGp pressure.

Other arrangements may include pressure relive valve 109 that takes all or part of the residual brine stream via line 128 from pipeline 28 and discharges it via pipeline 129. Pressure relive valve 109 may be configured to create a pulsed water stroke in different frequencies, smoothly change frequency, and adjust water stroke frequency to membrane natural frequency, and reach membrane resonance oscillation. Such pressure relief valve or water stroke generator may be controlled by a spring, diaphragm, solenoid, or other means. It can be adjusted manually or automatically. In multi stage RO systems, the pressure relief valve may be installed in interstate residual brine stream.

Figure 2:
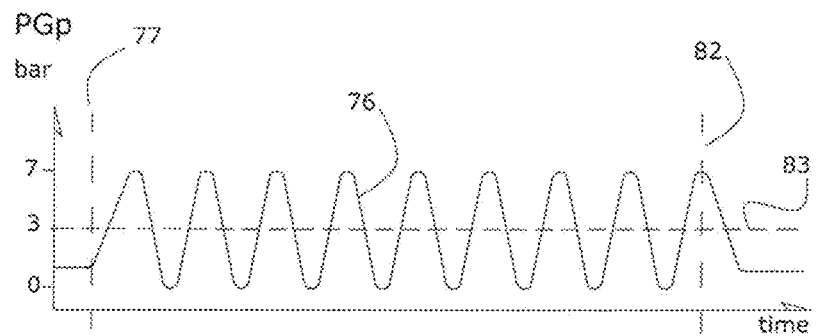
FIG. 2 is a graph illustrating an alternating permeate PGp pressure below and above NPSH by pump 10, according to at least one embodiment of the present disclosure.
Figure 3:
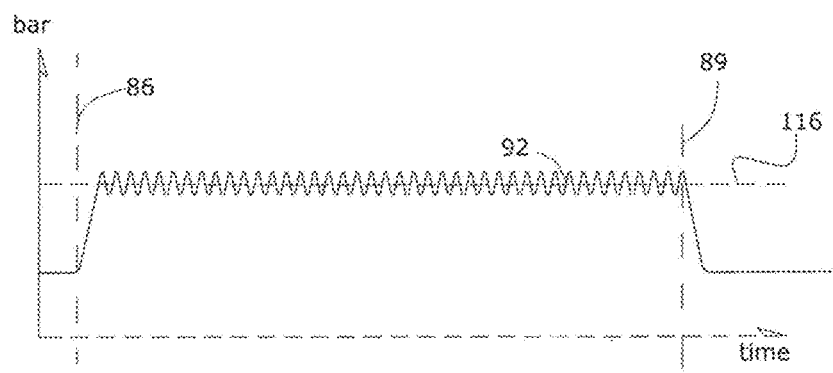
FIG. 3 is a graph illustrating alternating permeate PGp pressure by pump 10 and PRV 13, according to at least one embodiment of the present disclosure.

FIGS. 2 and 3 illustrate changes in PGp and PGr pressure during cleaning process FO&WS and have to be considered together with FIG. 1. FIGS. 2 and 3 show a smooth sinusoidal waveform, including half-wave increase and half-wave decrease, of gauge pressures and also illustrate sequences in which different devices are activated.

Process Description

Embodiments of the present disclosure cover a variety of options for membrane mechanical shaking without, but preferably with, resonance, by means of PGp and/or PGr gauge pressure strokes, optionally combined with reversing osmotic processes from RO to FO, or opposite, by means of injecting additional solution that changes the osmotic pressure from POr to POs that starts an osmotic pump. The osmotic pump may provide continuous backward permeate flow or, more preferably, in pulsation form following NPSH PGp pressure. Due to a wide variety of options, only a few process examples will be described below and with reference to the accompanying drawings.

In accordance with at least one embodiment of the disclosure, during a RO process, a cleaning procedure consisting of FO&WS can be initiated by closing valve 12, starting pump 10 which pumps permeate 27 from tank 26 into permeate channel 4 via pipeline 30 and 29. The beginning of the cleaning procedure may be seen as timeline 77 on FIG. 2. Pulse water strokes may be generated by series of quickly opening and closing valve 11 which move free membrane portions 16 of a basic unit 300 displacement (shaking) from a position 80 to a position 80'. Continuation of opening and closing valve 11 that causes set of pulse water strokes by frequency in the range about 0.2 to 0.1 Hz, by amplitude about ±4 bar, during he cleaning procedure is presented on FIG. 2 as PGp smooth sinusoidal pulsation line 76. Note that this PGp pressure stroke has no possibility of, and is not intended to change, NDP balance from RO to FO, but only to mechanically shake the membrane. The finishing point of the cleaning procedure takes place when pump 10 stops, valve 11 is closed, valve 12 is opened, and the separation module 100 continues its normal RO separation process, as may be seen as timeline 82 on FIG. 2. The actual time passing between timelines 77 and 82 is about three to five minutes. Fouling 9 which is located on membrane 14 may experience mechanical pulsed directional displacement force 1 that causes its detachment from membrane 14 and its removal with residual brine 28.

In accordance with at least one embodiment of the disclosure, at the same timeline 77 on FIG. 2, instantaneously with the pulse water stroke described above, a pulse of additional solution 24 from tank 23 may be fed into pump 22 instead of the raw solution 21 coming from tank 20, or in a combination with it. This may be done by opening valve 25 for about 3-50 seconds. The AS injection switches the osmotic pressure on the feed side 8 of membrane 14 from POr to POs. As a result, the new balance of the net driving pressure across membrane 14 experiencing the AS pulse temporarily reverses the process from RO to FO, and backward flow 2 of permeate 27 toward feed channel 5 takes place.

Fouling 9 which is located on membrane 14 may experience three forces: a first force 1, which may be generated due to a mechanical membrane pulsed directional displacement (shake) as a result of the pulsed water stroke; a second force 2, which may be generated by a permeate backward flow due to a temporarily backward permeate flow across membrane 14 caused by a pulse of an AS; and a third shearing force 3, due to the longitudinal feed and residual brine flow in the feed channel. This third shearing force 3 may increase during such a pulsed water stroke due to a simultaneous increased velocity of the feed flow. Such a simultaneous velocity increase may happen due to the following reasons: (a) the feed flow may increase due to fact that permeate is not squeezed out of the feed channel at that time into the permeate channel rather than the opposite, permeate flows backward from the permeate side into the feed side and increasing its flow; (b) the cross section of the feed channel 5, at least in the relevant area which experiences the pulsed water stroke, becomes narrower due to the fact that free membrane portions 16 are displaced toward the feed channel from a first position 80 to a second position 80'. The superposition of the above factors and forces act together to enhance the detachment of fouling 9 from membrane 14 and removal with residual brine.

According to an alternative embodiment of the disclosure, permeate backward flow 2 may take place not continuously as explained above, but only in the microseconds when membrane mechanical shaking 1 is in its maximum amplitude. The synchronization may take place when PGp fluctuation, line 76, crosses about in the middle of the line 83 that may be equal to NPSH value of osmotic pump (FIG. 2).

When PGp pressure is above NPSH value 83, the FO process provides backward permeate flow proportional to NDP-FO. When PGp pressure is below NPSH value 83, FO process cannot provide backward permeate flow proportional to NDP-FO, lines 76 and 83 (FIG. 2). Therefore, the accumulative effect is: a pulse of mechanical shaking and a pulse of backward permeate flow for fouling separation which may be stronger than a pulse of mechanical shaking and a continuous backward permeate flow.

Pulsating permeate backward flow 2 during FO&WH cleaning process has an additional benefit over continuous forward osmotic backward flow 2. In the pulsating form, a smaller amount of permeate crosses the membrane. Since permeate which crosses the membrane into the feed channel dilutes the additional solution 24, a smaller amount of permeate which crosses the membrane the lower the dilution and the concentration of the additional solution 24 lasts longer and may still be effective toward the end of the FO&WH cleaning process. Alternatively, due to the lowered dilution effect, it may be possible to use an additional solution having a lower osmotic pressure POs or generating shorter injection pulses of an additional solution in order to get the same cleaning effect.

Figure 7:
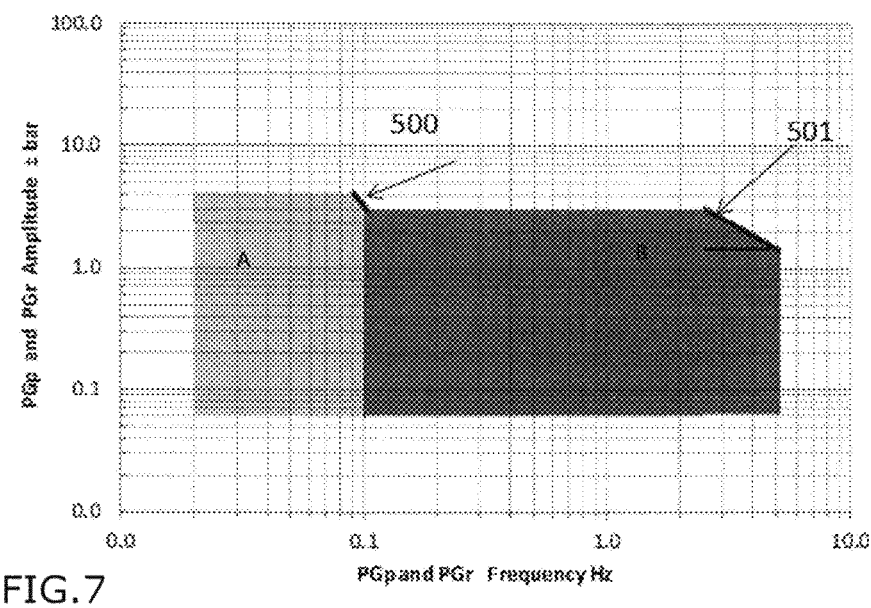
FIG. 7 is a graph showing "Amplitude-Frequency" area, according to at least one embodiment of the present disclosure.

Pulsating PGp to provide backward permeate flow 2 may be made in "Amplitude-Frequency" area "A" shown on FIG. 7. The frequency is about 0.02 to 0.1 Hz and the amplitude up to ±4 bar measured on the feed end of pressure vessel. The upper limit of the gauge pressure change velocity, 10 psi per second, should not be exceeded. This limiting value 10 psi per second is shown as line 500 on FIG. 7.

As mentioned above, the cleaning process based on embodiments of the disclosure is ecologically friendly because it is based on mechanical energy rather than chemicals.

Additional embodiments of this disclosure may increase the membrane cleaning effect by creating membrane oscillation by gauge pressure stroke PGp, shown on FIG. 1B as arrowhead 1, having a frequency approximately equal to natural frequency of about 2.5 Hz of the free membrane portions 16 in order to get a resonance and enhanced displacement. Membranes oscillating in a frequency proportional to their natural frequency may increase the amplitude of their vibration (resonance effect). Opening and closing valve 11 cannot be made at 2.5 Hz frequency. A Water Stroke Generator such as Pressure Relief Valve (PRV) 13 may be implemented to provide such frequent oscillation of PGp.

In accordance with at least one embodiment of the disclosure, during a RO process, a cleaning procedure FO&WS can be initiated by closing valve 12, starting pump 10 and keeping valve 11 continuously open. Pump 10 pumps permeate 27 from tank 26 into permeate channel 4 via pipeline 29, 30, 31 and via PRV 13 discharging it to tank 26 as a pulse flow. The beginning of cleaning procedure may be seen as timeline 86 on FIG. 3.

The configuration of PRV 13 may be selected by the ability to discharge permeate 27 as a series of pulses and create flow-induced vibrations.

Pulse water strokes generated by PRV 13 motivate free membrane portions 16 of a basic unit 300 resonance displacement (shaking) from a position 80 to a position 80', frequency about 2.5 Hz. A continuation of PRV flow-induced vibrations causes pulse water stroke during cleaning procedure shown on FIG. 3 as smooth, sinusoidal PGp pulsation line 92 around certain pressure 116. Free membrane portions 16 resonance oscillation for different membrane types may be in range of frequency 0.1 to 5 Hz with best results reached with 2.5 Hz for certain membrane types. The amplitude in this frequency range should be low and not exceed ±3 bar measured on feed end of pressure vessel. This recommended area of membrane resonance is marked its area "B" on FIG. 7. This PGp pressure stroke has no possibility or intention of changing NDP balance from RO to FO, but only provides for membrane resonance shaking. The finishing point of the cleaning procedure takes place when pump 10 stops, valve 11 is closed and valve 12 is opened, with the separation module 100 continues its normal RO separation process as may be seen as timeline 89 on FIG. 3. The actual time passes between timeline 86 and 89 is about three to five minutes. Fouling 9 which is located on membrane 14 may experience mechanical pulsed directional displacement force that causes its detachment from membrane 14 and its removal with residual brine 28.

In accordance with at least one embodiment of the disclosure, at the same timeline 86 on FIG. 3, instantaneously with the pulse water stroke described above, a pulse of additional solution 24 from tank 23 may be fed into pump 22 instead of the raw solution 21 coming from tank 20 or in a combination with it.

Figure 4:
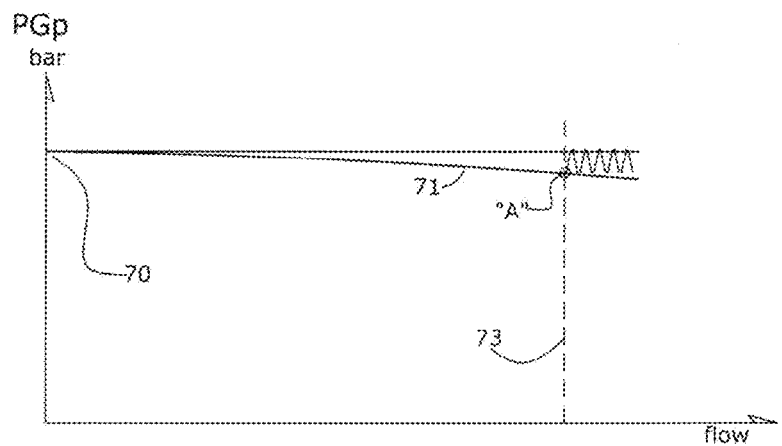
FIG. 4 is a flow and pressure graph for selection permeate pump 10 and PRV 13, according to at least one embodiment of the present disclosure.

FIG. 4 of the accompanying drawings shows an example of selection permeate pump 10 and pressure relief valve 13 by flow and pressure according to at least one embodiment of the present disclosure. Such a relationship may demonstrate, at least in one way among possible other ways, how to define pump 10 characterized by a curve 71. FIG. 4 further shows some aspects related to the requirements of pressure relief valve 13 according to this at least one embodiment.

In general, the flow output of permeate pump 10 and PRV 13 may be selected to meet the RO module nominal permeate production rate, which is defined in FIG. 4 as point "A". The pressure output of permeate pump 10, at its shut-off point 70, may be selected so that it is about 20% below the pressure rate of permeate pipe 29. Because of implementation small PGp amplitude, at least one embodiment of the present disclosure allows the use of low-pressure plastic permeate lines. Permeate pump 10 may have a flat pressure-flow characteristic. Permeate pump 10 may be equipped with a VSD to simplify the adjustment between pump duty pressure and the PRV's pressure set point "A."

Pressure relief valve or other water stroke generator 13 may be selected to meet the nominal permeate out flow 73 of RO module 100, and pressure relief set point "A." Above this point "A," PRV relieves permeate flow 27 at frequency between 0.1 and 5 Hz. The frequency of such pressure pulsations may be smoothly adjusted by, for example, adjusting spring tension or changing water passes to diaphragm valve or by a programmable logic controller changing the frequency automatically or manually until highest turbidity of reject brine flow will be reached. An increase in turbidity indicates that resonance was reached. It is recommended to make variations of frequency nearby, or close to, the best frequency.

Pumps 10 and 22 should hydraulically and/or electrically communicate in order to control and stop pump 10 immediately if pump 22 has stopped for any reason. This safety precaution has to be duplicated and even triplicated to ensure that permeate pressure PGp will never be more than the feed pressure PGr, as known to the skilled man in the art.

In accordance with at least one embodiment of the disclosure, membrane oscillation can be initiated by pulse water strokes PGr generated by PRV 109 positioned in residual brine stream 28. The pulse water strokes PGr may have sinusoidal pulsation 93 around nominal PGr pressure 116. The pressure presented as line 116 on FIG. 3 may have very different values for PGp and PGr pulsation.

Membrane mechanical shaking 1 may be made by gauge pressure stroke PGr and/or PGp in "Amplitude-Frequency" range "B" shown on FIG. 7. The frequency is in range of about 0.1 to 5 Hz. It is recommended not to exceed gauge pressure amplitude more than ±3 bar, measured on common manifold at the feed end of pressure vessels. It is recommended not to exceed the 45 psi/second oscillation velocity, line 501 on FIG. 7.

For seawater applications, it is recommended to apply PGr gauge pressure stroke amplitude below ±5% of the normal operation range. To be effective, PGr pulsation has to be smoothly sinusoidal, and the water strokes generator has to have smoothly adjustable frequency. As described above, an indication of resonance is demonstrated by an increase in turbidity of the residual brine stream.

Figure 5:
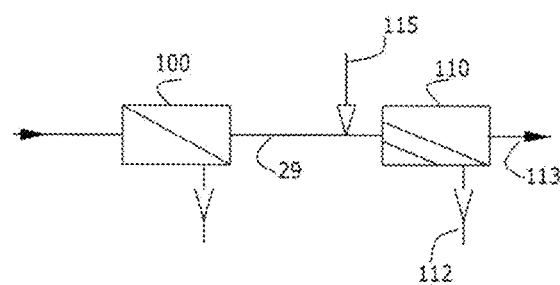
FIG. 5 is a schematic drawing illustrating at least one embodiment of the present disclosure incorporated into the entire scheme of water treatment.

FIG. 5 of the accompanying drawings shows a standard UF module operating as Ultra-Filtration Batch Absorber 110 positioned down stream of RO module 100 and receives permeate 29 as feed. Sorbent injects via dosing system 115 continuously or as a pulse in to UF module 110, at the rate according to required water quality. Sorbent accumulates in UF module during dead-end filter cycle, and performs mass transfer and diffusion with organic matter presented in permeate stream 29. Dead-end filtration cycle keeps sorbent in UF fibers until its sorption capacity is exhausted. During periodic backwash, sorbent 115 may be discharged via outlet 112. The high purity product without organic matter is delivered from outlet 113.

Figure 6:
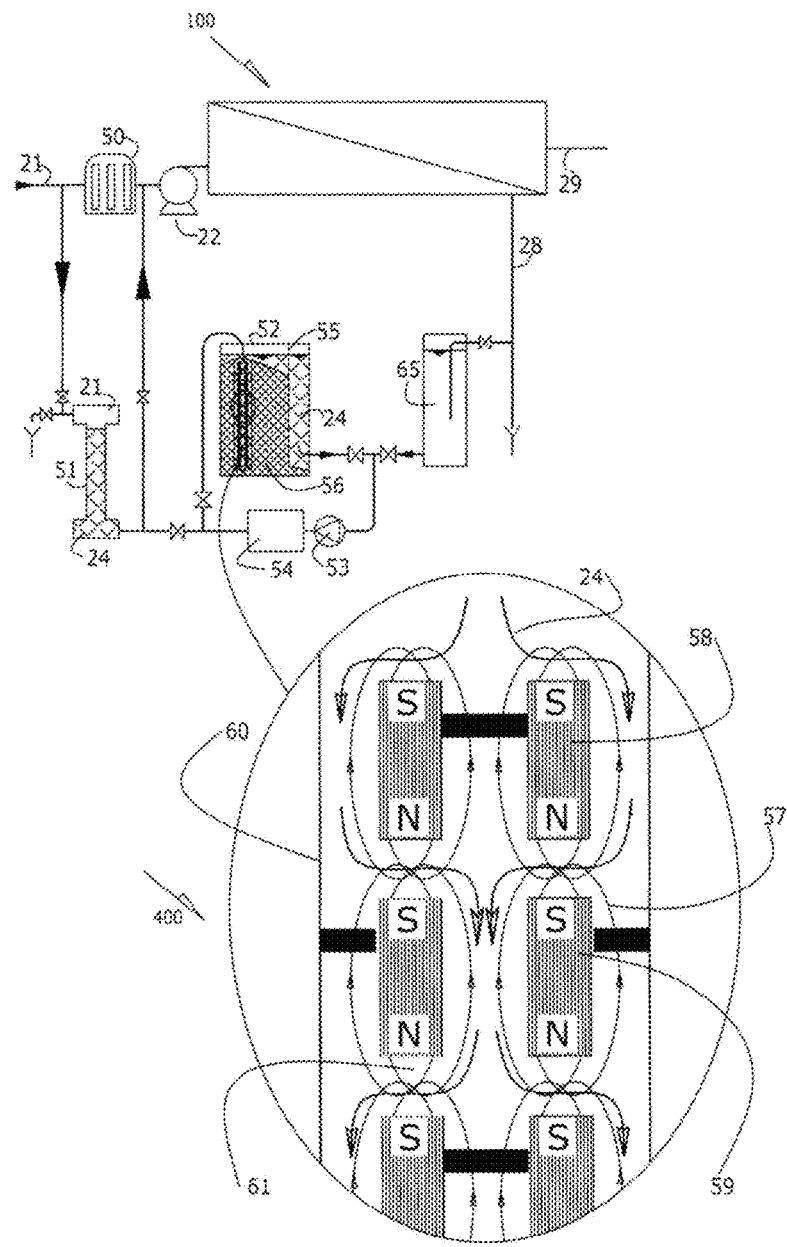
FIG. 6 is a general view of a membrane module incorporated into an arrangement for AS preparation and injection, according to at least one embodiment of the present disclosure.

FIG. 6 shows a general view of membrane module and arrangement for options of additional solution preparation and injection.

Raw saline solution 21 passes through micronics filter 50. Feed Pump 22 pumps raw saline solution 21 into the RO module 100. Product leaves module 100 via pipeline 29, residual brine is removed via pipeline 28. According to at least one embodiment of the disclosure, additional solution 24 may be fed into the membrane from a syringe type pump 51. This syringe pump may have a vertical arrangement of pipes. The syringe pump may be charged from the bottom by an additional solution 24 from tank 52 and by a pump 53 via filter 54. Syringe pump 51 operates by pressure drop on micronics filter 50. No piston is needed in the syringe pump, because the difference in specific gravity between the raw saline solution 21 and the additional solution 24 is enough to prevent a mix of the two. Additional solution 24 may be prepared from a residual brine removed via pipeline 28 during previous FO&WS cleaning procedure. Additional solution 24 does not chemically interact with the fouling. The aim of the additional solution is only to serve as an osmotic source of energy to operate the forward osmotic pump during a FO&WS cleaning. The concentration of the additional solution may be diminished due to dilution by permeate backward flow during cleaning; however, its concentration at the end of the process is still quite high, and may save salt for next additional solution preparation. Accordingly, the FO&WS cleaning procedure according to the present disclosure is ecologically friendly.

Residual Brine 28 is collected during previous FO&WS cleaning sessions in tank 65. Residual brine 28 may be filtrated by micronics filter 54 and may be added to tank 52 for re-concentration. Tank 52 comprises of a wall 55. Wall 55 does not reach the bottom of tank 52. Wall 55 start from an about a height of 50 mm above the bottom of tank 52 allowing water to flow and circulate below it but prevents dry salt to fill pump 53 suction compartment. Pump 53 circulates the additional solution for the purpose to re-concentrate it until its saturation level. Dry salt 56 is loaded into tank 52. During the additional solution circulation, the additional solution passes gaps 61 between one or several magnets 58 and 59. In accordance to one aspect of the disclosure, magnetic treatment based on permanent magnets may be made of FeNdB, NdFeB, Neodymium (Nd), Dysprosium (Dy), or Praseodymium (Pr) having, for example, 0.5 to 10 Tesla.

In accordance with at least one embodiment of the disclosure, a magnetic treatment device 400 may consist of a tower of multiple magnets allowing water to pass through their magnetic field. According to at least one embodiment, two types of magnets may be used: Ring shape magnets 58 with plugged holes, and ring shape magnets 59 with holes and peripheral plugs. These magnets may be arranged in pipe 60 in such a way that gaps 61 between adjacent magnets is created and water may pass one magnet through its internal hole and the next magnet from the outside.

Gaps 61 between adjacent magnets are the areas where the magnetic field 57 is the strongest. During dissolution of the dry salt and after its dissolution, the additional solution 24 may be circulated continuously via the magnetic treatment device. According to at least one embodiment, charging the syringe pump 51 with the additional solution 24 should be made immediately before the additional solution 24 is to be fed into the membrane module 100 during the FO&WS cleaning procedure.

This magnetic treatment device increases the osmotic coefficient and actual osmotic pressure of additional solution 24.

The mechanical shaking of the membrane with periodic feeding of additional solution to the feed side of the membrane, as described with reference to FIGS. 1 to 7, is carried out periodically, such as once a day for approximately 10 seconds. It does require a temporary halt in the reverse osmosis process but provides enhanced fouling detachment and hence, cleaning of the membrane.

In an alternative embodiment of the present disclosure, cleaning may be carried out all the time with no feeding of additional solution (AS) to the feed side. In this embodiment, known as "KEEPING CLEAN PROCEDURE" ("KCP"), mechanical shaking of the free membrane portions to detach foulant is again carried out by applying, for a predetermined period of time, a plurality of directional pressure strokes PGp and/or PGr on the permeate and/or residual brine membrane side. In addition, a pulse-wise flow regime is applied in the residual brine stream to increase the shearing force to the membrane, thereby achieving enhanced fouling evacuation.

In this embodiment, the pressure strokes are precisely synchronized with flow pulsation, preferably in the alternating sequence: PGr pressure decreasing, shearing force increasing; PGp increasing; followed by PGr pressure increasing, shearing force decreasing, PGp pressure decreasing, thereby providing synergetic enhancement of fouling detachment and evacuation. The required cleaning effect is achieved when the free membrane portions shaking provided by residual brine gauge pressure PGr sharp decrease is precisely synchronized with permeate gauge pressure PGp sharp increase and precisely synchronized with residual brine flow velocity increase.

As a non-limiting example, precise synchronization may be reached by connecting the water generator to a 3-way valve connected to the residual brine stream, permeate stream, and to drain. A flexible diaphragm or sealed piston or similar means may be provided between the synchronized streams. The 3-way valve may switch the water stroke generator between two positions to provide the required sequence, as follows:

Position 1: The 3-way valve opens brine flow to water stroke generator causing PGr decrease, shearing force increase, and permeate pressure PGp increase; and Position 2: The 3-way valve closes brine flow and connects water stroke generator to drain, causing PGr increase, shearing force decrease, and PGp decrease.

Figure 8:
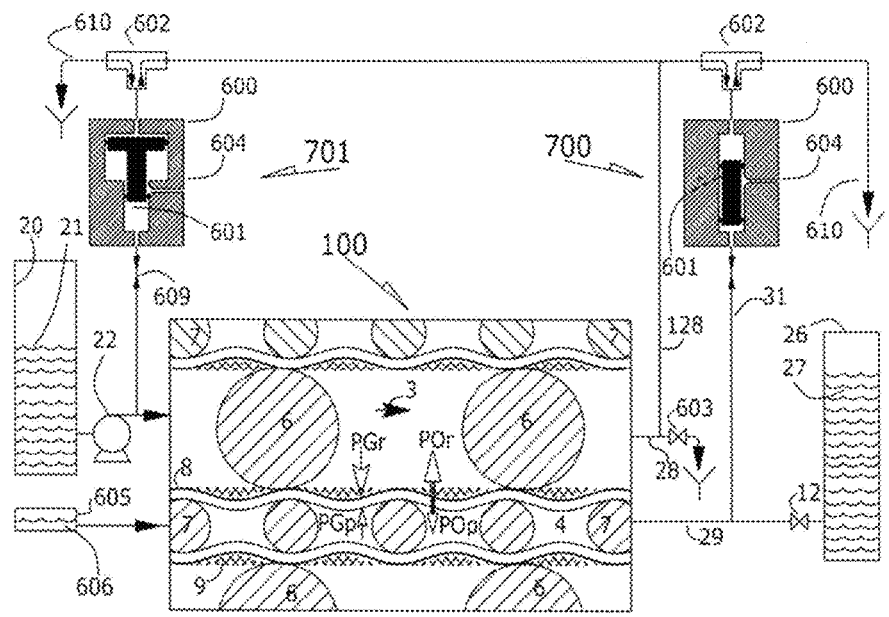
FIG. 8 is a schematic view of a system, according to at least one embodiment of the present disclosure, having a water stroke generator for pressure and flow pulsation.

FIG. 8 of the accompanying drawings illustrates one example of an apparatus for achieving the aforementioned Keeping Clean Procedure. Water stroke generator 600 has a moveable sealed piston 601. The piston 601 may have an equal diameter in the residual brine and permeate sides or have a different diameter on each side. One side of water stroke generator 600 is connected to permeate pipeline 29 via pipeline 31. The other side is connected to the residual brine stream 128 or to the drain via a 3-way valve 602. The stroke generator may also be provided with a vent 604. The 3-way valve 602 has an activator controlled by a Programmable Logic Control (PLC) (not shown on FIG. 8). The activator serves to change the 3-way valve position by the required frequency. The 3-way valve is movable between two positions (Position 1 and 2 above) wherein, in Position 1, valve 602 connects line 128 to the water stroke generator 600 and disconnects drain line 610 and Position 2, wherein valve 602 disconnects line 128 from the water stroke generator 600 and connects the drain line 610 to it.

As shown in FIG. 8, the arrangement 701 has similar connections with the modification that one side of the water stroke generator 600 is connected via pipeline 609 to feed line, or to interstate residual brine stream pipeline in multistage RO systems, or to residual brine pipeline 28 instead of the permeate line 29. Osmosis separation modules 100 may have residual brine stream valve 603 which opens and closes synchronically with valve 602. Permeate exiting from the permeate enclosure may be throttled by valves 12.

Thus, during normal reverse osmosis process through the osmosis separation module 100, the keeping clean procedure (KCP) is carried out with the stroke generator 600 being switched between the two positions by means of the 3-way valve 602, providing precise synchronization of pressure and flow alteration. The frequency movement of valve 602 between the two positions may be tuned in to the vicinity of free membrane portions natural frequency for achieving constructive and/or beating interference oscillation of said membrane portions measurable as increase in residual brine stream turbidity. The pattern of movement may be continuous, rotational, or include fast movement when the valve changes between positions with some holdback in each open position. The holdback may not be equal in Position 1 and Position 2.

For large flow modules, continuous operation of arrangement 700 may be combined with arrangement 701, and may be combined with continuous operation of valve 603. Arrangement 700 and 701 may work synchronically, asynchronically, or each of them alone. Several arrangements 700 and/or 701 may be installed in different positions of large flow osmosis modules.

The aforementioned 3-way valve arrangement is only one example of different arrangements that may provide precise synchronization between PGr decrease, shearing force increase, and PGp increase. Additional valves may be installed in the exit of the residual brine stream and/or permeate stream synchronized with the water stroke generator for pulse-wise discharge of brine in large modules. Such a valve in the exit of the residual brine stream may operate alone, without a stroke generator, closing and opening residual brine for providing pulse-wise flow. A single valve arrangement is likely to produce a reduced cleaning effect than combined with the stroke generator but be better than a standard continuous residual brine flow approach.

The pressure pulses PGr and/or PGp synchronized "in phase" on feed and/or permeate sides, respectively, may provide "Constructive Pressure Wave Interference" or Beating Pressure Wave Interference with free membrane portion resonance oscillations. To reach such effect, the frequency of pressure pulsed has to be tuned to value equal, proportional, or close to natural frequencies of free membrane portions.

The beating phenomenon may be used as instrument of tuning gauge pressure pulsation frequency into vicinity of membrane portions natural frequency. Because the same membrane element may have different sizes of free portions membrane, the beating phenomenon may take place in different frequencies and tuning gauge pressure pulsation frequency may be required in wide range. Measurement of reject flow turbidity may be a good indicator for selection of the right frequency range.

The Keeping Clean Procedure that may be performed all the time may be subjected to an additional activity at periodic time intervals as part of the procedure or as an independent procedure. The additional cleaning activity comprises a periodic osmotic backwash (POB) which may be performed with or without oxidation. This activity is made on-line without stopping the feed pump, with very limited interruption in the normal desalination process. The periodic osmotic backwash may take a few minutes and may be implemented daily or every few hours. The backwash may employ an extremely small amount of cleaning solution that need not be discharged after use.

The periodic osmotic backwash is based on high frequency (e.g., several times a minute) changes from Reverse Osmosis (RO) to Forward Osmosis (FO). This is brought about without feeding of Additional Solution to the feed side of the membrane but rather involves extremely fast and precise synchronized changes of the residual brine and permeate gauge pressures; decrease PGr, increase PGp and vice versa. In this respect, the process changes from RO to FO when the sign of net driving pressure, defined by the balance of osmotic and gauge pressures PGr, POr, POp, and PGp changes.

The POB procedure is based on our new understanding that the process change between Reverse Osmosis to Forward Osmosis may be extremely quick based on simultaneously, opposite sign, change of gauge pressures PGr and PGp. A quick change may take place because the osmotic process does not have massive inertial parts, and therefore change in flow direction may take place immediately. This is not the case if process change between Reverse Osmosis to Forward Osmosis is based on injection of Additional Solution and a change osmotic pressure from POr to POs. This process cannot be quick.

Additionally, the POB procedure is based on our further understanding that the backwash process on the membrane may be extremely short in time, because the distance on which fouling has to be moved from membrane surface may be a few microns, if the shearing force of residual brine increases precisely in these microseconds when both pressures PGr and PGp shake the membrane in the same direction and backward flow of permeate takes place.

Furthermore, field experiments that have been carried out demonstrate that dozens of fast and frequent changes back and forth between RO and FO and dozens of short backwashes are more effective in fouling removal than one single change from RO and FO and one long backwash.

A non-limiting numerical example to show this POB process is as follows:

$$NDP(FO\ or\ RO)=+PGr-POr-PGp+POp$$

$$NDP(RO)=+12-3-1+0.1=+8.1\ bar.\ The\ sign\ (+)$$
means the process is RO.

Thus, the difference between Keep Clean Procedure (KCP) and the periodic backwash procedure (POB) is in adding one-step: throttling permeate exiting from permeate enclosure, increasing permeate gauge pressure PGp until the NDP value become equal to zero. In a non-limiting numerical example, PGp increases from 1 bar to 9.1 bar.

$$NDP(Neutral)=+12-3-9.1+0.1=0.0\ bar$$

Precisely synchronized directional strokes with opposing change of pressure: PGp (between 11.5 and 12.5 bar) and PGr (between 9.6 and 8.6 bar) providing a plurality of quick RO-FO-RO process changes.

$$NDP(FO)=+11.5-3-9.6+0.1=-1.0\ bar.\ The\ sign\ (-)$$
means the process is FO.

$$NDP(RO)=+12.5-3-8.6+0.1=+1.0\ bar.\ The\ sign\ (+)$$
means the process is RO.

In an alternative embodiment, the quick back and forth movement of permeate across the membrane caused by changing the process between RO and FO as described above is enhanced by the inclusion of a strong oxidizing agent. This procedure is termed "Periodical Oxidation and Osmotic Backwash" (PO&OB) and involves the addition of another step, being to inject cleaning solution into the permeate enclosure, preferable before the permeate throttling step. PO&OB may be implemented for membranes such as, for example, graphene, zeolite, carbon, ceramic, nanostructures, mix matrix, etc. that are able to withstand a high concentration of strong oxidizers.

Different types of cleaning-solutions may be used in the PO&OB process. Preferably, the cleaning solution is able to pass via semipermeable membrane in both directions. A non-limiting example of a suitable cleaning solution is a high concentration of oxygen dissolved in water for organic fouling removal, or a high concentration of carbon dioxide dissolved in water for calcium carbonate scaling removal.

The PO&OB cleaning of membrane requires a hundred-fold less amount of chemicals compared to standard CIP process, where chemical solution circulates in feed-brine stream, external piping, CIP tanks, filters, and pumps.

Such a small amount of cleaning solution is enough because the cleaning solution is located only in small permeate spacer area, not circulating through the system; it only goes back and forth in the distance of few microns passing the membrane. Most of cleaning solution may be directed back after cleaning session into the same tank from which it was injected for cleaning. This repeated use of chemicals is possible because cleaning solutions acts in feed membrane side when it is in FO mode and cleans itself when it is coming back through membrane in RO mode.

The POB may include implementation of cleaning solution PO&OB as an option. The six step POB procedure with the PO&OB option, presented below is a non-limiting example. It uses the same water stroke generator, and the same 3-way valve Position 1 and 2, that is presented in the previous embodiment "KCP" and shown in FIG. 8.

Step 1 (option with cleaning solution PO&OB): Cleaning solution injected in one side of permeate enclosure and fills it up when the separation module is in normal RO operation.

Step 2: Throttling permeate exiting from permeate enclosure. Reaching NDP (Neutral).

Step 3: The 3-way valve in Position 1 opens brine flow to the water stroke generator, causing: PGr decreasing; and PGp increasing. Process changed from Reverse Osmosis to Forward osmosis. Backwash by permeate takes place and fouling evacuation by high shearing force. (Fouling oxidizes or dissolves option PO&OB).

Step 4: The 3-way valve in Position 2 closes brine flow and connects the water stroke generator to drain. PGr increasing due to water hammer caused by sudden valve closing; permeate pressure PGp decreasing, caused by sudden opening brine side of water stroke generator to drain; and shearing force in feed membrane side decreasing. Process changed from Forward osmosis to Reverse Osmosis. Permeate goes back to permeate area. In the PO&OB option, chemical solution filters itself by this back movement via membrane.

Steps 3 and 4 are repeated frequently causing "back and forth" dozens of times backwash and, optionally, dozens of fouling oxidation, or scaling dissolution.

Step 5 (option with cleaning solution PO&OB): Cleaning solution moves back to storage tank for re-concentration and reuse.

Step 6: Permeate enclosure opens by valve and begin normal RO operation.

Practical implementation of POB procedure may request two field adjustments for each specific osmosis separation module. The first adjustment is throttling permeate exiting from permeate enclosure for reaching NDP neutral. Although the value of PGp equal to neutral NDP may be calculated, it is worth to make some variation around this value, until the maximum increase of brine turbidity may be measured. The second adjustment is tuning the frequency of pressure stroke alteration into the vicinity of free membrane portions natural frequency, also measurable as an increase in residual brine stream turbidity.

In accordance with one embodiment of the disclosure for heavy fouling conditions, shearing force may be increased even more if other water stroke generators will be installed in the residual brine line between stages of osmosis separation modules and/or outlets from them, with modification, that, instead of permeate line, the residual brine line will constantly be connected to it.

Thus, the embodiment of the disclosure shown in FIG. 8 may carry out different cleaning operations, either continuously or at predetermined time intervals. Osmotic separation module 100 performs normal reverse osmosis process, which may include, as non-limiting examples, several options of operation:

Option A. Normal RO process which may include Keeping Clean Procedure.

Option B. Normal RO process which may include Keeping Clean Procedure and intermittently applied "Periodical Osmotic Backwash."

Option C. Normal RO process may include Keeping Clean Procedure, and intermittently applied "Periodical Osmotic Backwash" and some of "Periodical Osmotic Backwash" may be performed as Periodical Oxidation & Osmotic Backwash" (PO&OB).

Each of mentioned above procedures KCP, POB, and PO&OB may be combined as described above or applied as a separate procedure in any configuration.

The six steps below present the POB and PO&OB procedure. The steps required for PO&OB procedure are marked (option PO&OP):

Step 1 (option PO&OP): Cleaning solution 606 injected from tank 605 and fills up permeate enclosure 29.

Step 2: Valve 12 throttles permeate exiting from permeate enclosure 29. Pressure PGp increases until neutral net driving pressure NDP reached.

Step 3: The 3-way valve 602 in Position 1 opens residual brine stream 28 exiting from the module 100 towards water stroke generator 600 causing precise synchronically: PGr decreasing; PGp increase, increasing shearing force 3, and providing short FO process.

Step 4: The 3-way valve 602 in Position 2 closes brine flow from line 28, and connects the water stroke generator to drain 610. PGr increasing due to water hammer caused by sudden valve 602 closing; permeate pressure PGp decreasing, caused by sudden opening brine side of 3-way valve 602 to drain 610. Precise synchronically PGr increase; PGp decrease provide short RO process. Shearing force 3 in feed membrane side decreasing. Permeate goes back to permeate area. (Option PO&OP) chemical solution filters itself by this back movement via membrane.

Steps 3 and 4 repeated frequently causing "back and forth" dozens of times changes RO-FO-RO process, and backwash. If cleaning solution option included dozens of fouling oxidation, or scaling dissolution will take place.

Step 5 (option PO&OP): Cleaning solution 606 moves back to storage tank 605 for re-concentration and reuse.

Step 6: Valve 12 opens module 100 returns to normal RO operation.

POB and PO&OB cleaning in addition to the above-mentioned KCP procedure executes:

Enhanced foulant detachment and evacuation, due to applying plurality quick RO-FO-RO backwash procedures;

Enhanced fouling oxidation and scaling dissolution, due to applying chemical treatment of fouling during plurality cleaning solution penetration via membrane in RO-FO-RO process; and Enhanced foulant evacuation may have more technological benefits, such as an increase in recovery of separation module operation.

Arrangement 701 is intended to provide a plurality of directional pressure strokes in a residual brine stream between stages of osmotic separation modules by using the remainder pressure of the final residual brine stream, and applying pulse-wise flow regime to increase shearing force, achieving enhanced fouling evacuation. In some embodiments, arrangement 701 may use pressure in the residual brine for pulse-wise pumping in separation module raw saline solution to increase shearing force.

In at least one embodiment of the disclosure, a method for cleaning a semi-permeable membrane in a pressure retarded osmosis module is disclosed. The method comprises: providing a pressure retarded osmosis (PRO) module comprising: (1) an enclosure comprising a semi-permeable membrane with a first side and a second side opposite the first side, with foulant located on at least the second side, (2) a raw saline solution having an osmotic pressure POr at a gauge pressure PGr for entering the first side of the semi-permeable membrane, and (3) a fluid stream having a gauge pressure PGp and an osmotic pressure POp for entering the second side of the semi-permeable membrane; and periodically changing the balance of pressures from functioning as the PRO to functioning as reverse osmosis (RO) by creating a net driving pressure that is opposite to the PRO, thereby inducing the RO process to create backward flow towards the second side of the semi-permeable membrane, thereby lifting the foulant and enhancing evacuation of the foulant.

Additionally, at least part of a fluid from the fluid stream penetrates from the second side of the semi-permeable membrane to the first side according to a net driving pressure (NDP) defined by a balance of pressures PGr, POr, POp, and PGp, as pressure retarded osmosis (PRO), wherein a remainder of the fluid exits at least periodically as a residual fluid stream from the second side of the semi-permeable membrane via an outlet, and wherein the raw saline solution and the penetrated fluid exits as a residual brine stream from the first side of the semi-permeable membrane via a residual brine outlet.

As a non-limiting numerical example of the aforementioned PRO process:

NDR=PG$r$−PG$p$−PO$r$+PO$p$, where PG$r$=70 bar, PG$p$=10 bar, PO$r$=112 bar, and PO$p$=1 bar. Equation 1:

Thus, NDP=70−10−112+1=−51 bar, where the minus (−) sign indicates PRO.

The aforementioned changing of the process from PRO to RO can be reached by changing osmotic pressures or gauge pressures or both. The change can be made on the first or on the second membrane side, or on both.

As a non-limiting numerical example of the changing of the process from PRO to RO, where the gauge pressure is changed on the first side, the raw solution gauge pressure is changed from PG$r$=70 bar to PG$r$=150 bar:

NDR=PG$r$−PG$p$−PO$r$+PO$p$, where PG$r$=150 bar, PG$p$=10 bar, PO$r$=112 bar, and PO$p$=1 bar.

Thus, NDP=150−10−112+1=+29 bar, where the plus (+) sign indicates RO.

In at least an additional embodiment, the changing balance of pressures is achieved by periodically directing the raw saline solution, instead of the fluid stream, to enter the second side of the semi-permeable membrane. As a non-limiting example of this RO process, the values below are the same as in Equation 1, except that PO$p$=112 bar instead of 1 bar:

NDR=PG$r$−PG$p$−PO$r$+PO$p$, where PG$r$=70 bar, PG$p$=10 bar, PO$r$=112 bar, and PO$p$=112 bar.

Thus, NDP=70−10−112+112=+60 bar, where the plus (+) sign indicates RO.

In at least an additional embodiment, the changing balance of pressures is achieved by periodically directing the fluid stream, instead of the raw saline solution, to enter the first side of the semi-permeable membrane. As a non-limiting example of this RO process, the values below are the same as in Equation 1, except that PO$r$=1 bar instead of 112 bar:

NDR=PG$r$−PG$p$−PO$r$+PO$p$, where PG$r$=70 bar, PG$p$=10 bar, PO$r$=1 bar, and PO$p$=1 bar.

Thus, NDP=70−10−1+1=+60 bar, where the plus (+) sign indicates RO.

In at least an additional embodiment, the changing balance of pressures is achieved by periodically directing the raw saline solution, instead of the fluid stream, to enter the second side of the semi-permeable membrane, and directing the fluid stream, instead of the raw saline solution, to enter the first side of the semi-permeable membrane. As a non-limiting example of this RO process, the values below are the same as in Equation 1, except that PO$r$=1 bar instead of 112 bar, and PO$p$=112 bar instead of 1 bar.

NDR=PG$r$−PG$p$−PO$r$+PO$p$, where PG$r$=70 bar, PG$p$=10 bar, PO$r$=1 bar, and PO$p$=112 bar.

Thus, NDP=70−10−1+112=+171 bar, where the plus (+) sign indicates RO.

In at least an additional embodiment, the changing balance of pressures is achieved by periodically directing an Additional Solution (AS), instead of the raw saline solution, to enter the first side of the semi-permeable membrane. It should be appreciated that the AS solution can have any value required to change the process from PRO to RO. Thus, the AS can sometimes have a high osmotic pressure, and sometimes a low osmotic pressure. As a non-limiting example of this RO process, the values below are the same as in Equation 1, except, instead of PO$r$=112 bar, the directed AS solution has a low osmotic pressure of 5 bar, so PO$r$=5 bar.

NDR=PG$r$−PG$p$−PO$r$+PO$p$, where PG$r$=70 bar, PG$p$=10 bar, PO$r$=5 bar, and PO$p$=1 bar.

Thus, NDP=70−10−5+1=+56 bar, where the plus (+) sign indicates RO.

In at least an additional embodiment, the changing balance of pressures is achieved by periodically directing an Additional Solution (AS), instead of the fluid stream, to enter the second side of the semi-permeable membrane. It should be appreciated that the AS solution can have any value required to change the process from PRO to RO. Thus, the AS can sometimes have a high osmotic pressure, and sometimes a low osmotic pressure. As a non-limiting example of this RO process, the values below are the same as in Equation 1, except, instead of PO$p$=1 bar, the directed AS solution has a high osmotic pressure of 200 bar, so PO$p$=200 bar.

NDR=PG$r$−PG$p$−PO$r$+PO$p$, where PG$r$=70 bar, PG$p$=10 bar, PO$r$=112 bar, and PO$p$=200 bar.

Thus, NDP=70−10−112+200=+148 bar, where the plus (+) sign indicates RO.

In at least an additional embodiment, the changing balance of pressures is achieved by periodically directing an Additional Solution (AS), instead of the raw saline solution, to enter the first side of the semi-permeable membrane, and directing another instance of the AS, instead of the fluid solution, to enter the second side of the semi-permeable membrane. It should be appreciated that the AS solution can have any value required to change the process from PRO to RO. Thus, the AS can sometimes have a high osmotic pressure, and sometimes a low osmotic pressure. As a non-limiting example of this RO process, the values below are the same as in Equation 1, except, instead of PO$r$=112 bar and PO$p$=1 bar, the AS solution has a low osmotic pressure of PO$r$=4 bar for directing to the first side, and a high osmotic pressure of PO$p$=180 bar for directing to the second side.

NDR=PG$r$−PG$p$−PO$r$+PO$p$, where PG$r$=70 bar, PG$p$=10 bar, PO$r$=4 bar, and PO$p$=180 bar.

Thus, NDP=70−10−4+180=+236 bar, where the plus (+) sign indicates RO.

In at least an additional embodiment, a generator of pressure strokes installed in an inlet and in the outlet of the second side is configured to pump in the AS to the inlet and to release the AS from the outlet of the second side.

In at least an additional embodiment, a generator of pressure strokes installed in an inlet and in the outlet of the second side is configured to pump in the AS to the inlet and to release the AS from the outlet of the second side.

In at least an additional embodiment, a generator of pressure strokes installed in an inlet and/or the outlet of the second side is configured to release flow from the second side, wherein the release occurs from the inlet, from the outlet, or from the inlet and the outlet.

In at least an additional embodiment, the method for cleaning a semi-permeable membrane in a pressure retarded osmosis module further comprises applying a pulsed-flow regime in the fluid stream, thereby increasing shearing force for enhancing evacuation of the foulant. This pulsed-flow regime is achieved by continuously pumping in fluid stream to the second side of the membrane, where the residual fluid stream periodically exits from the second side of the semi-permeable membrane.

In at least an additional embodiment, the method further comprises applying, at least periodically, a plurality of directional pressure strokes having PGp and/or PGr directed from at least one of the fluid stream or the residual brine stream to the first side of the semi-permeable membrane, thereby effecting mechanical shaking of the semipermeable membrane for detachment of the foulant.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A method for cleaning a semi-permeable membrane in a pressure retarded osmosis module, the method comprising:
   providing a pressure retarded osmosis module comprising:
      an enclosure, the enclosure comprising a semi-permeable membrane with a first side and a second side opposite the first side, with foulant located on at least the second side,
      a raw saline solution having an osmotic pressure POr at a gauge pressure PGr for entering the first side of the semi-permeable membrane,
      a fluid stream having a gauge pressure PGp and an osmotic pressure POp for entering the second side of the semi-permeable membrane,
      wherein at least part of a fluid from the fluid stream penetrates from the second side of the semi-permeable membrane to the first side according to a net driving pressure (NDP) defined by a balance of pressures PGr, POr, POp, and PGp, as pressure retarded osmosis (PRO),
      wherein a remainder of the fluid exits at least periodically as a residual fluid stream from the second side of the semi-permeable membrane via an outlet,
      wherein the raw saline solution and the penetrated fluid exits as a residual brine stream from the first side of the semi-permeable membrane via a residual brine outlet; and
   periodically changing the balance of pressures from functioning as the PRO to functioning as reverse osmosis (RO) by altering the NDP from negative to positive, thereby inducing the RO process to create backward flow towards the second side of the semi-permeable membrane, thereby lifting the foulant and enhancing evacuation of the foulant.

2. The method of claim 1, wherein the changing balance of pressures is achieved by periodically directing the raw saline solution, instead of the fluid stream, to enter the second side of the semi-permeable membrane.

3. The method of claim 1, wherein the changing balance of pressures is achieved by periodically directing the fluid stream, instead of the raw saline solution, to enter the first side of the semi-permeable membrane.

4. The method of claim 1, wherein the changing balance of pressures is achieved by periodically directing the raw saline solution, instead of the fluid stream, to enter the second side of the semi-permeable membrane, and directing the fluid stream, instead of the raw saline solution, to enter the first side of the semi-permeable membrane.

5. The method of claim 1, wherein the changing balance of pressures is achieved by periodically directing an Additional Solution (AS), instead of the raw saline solution, to enter the first side of the semi-permeable membrane.

6. The method of claim 1, wherein the changing balance of pressures is achieved by periodically directing an Additional Solution (AS), instead of the fluid stream, to enter the second side of the semi-permeable membrane.

7. The method of claim 1, wherein the changing balance of pressures is achieved by periodically directing an Additional Solution (AS), instead of the raw saline solution, to enter the first side of the semi-permeable membrane, and directing another instance of the AS, instead of the fluid solution, to enter the second side of the semi-permeable membrane.

8. The method of claim 6, wherein a generator of pressure strokes installed in an inlet and in the outlet of the second side is configured to pump in the AS to the inlet and to release the AS from the outlet of the second side.

9. The method of claim 7, wherein a generator of pressure strokes installed in an inlet and in the outlet of the second side is configured to pump in the AS to the inlet and to release the AS from the outlet of the second side.

10. The method of claim 1, wherein a generator of pressure strokes installed in an inlet and/or the outlet of the second side is configured to release flow from the second side, wherein the release occurs from the inlet, from the outlet, or from the inlet and the outlet continuously or periodically as pulse flow.

11. The method of claim 1, further comprising:
   applying a pulsed-flow regime in the fluid stream, thereby increasing shearing force for enhancing evacuation of the foulant by periodic release, via an outlet, of the residual fluid stream from the second side of the semi-permeable membrane.

12. The method of claim 1, further comprising:
   applying, at least periodically, a plurality of directional pressure strokes having PGp and/or PGr directed from at least one of the fluid stream or the residual brine stream to the first side of the semi-permeable membrane, thereby effecting mechanical shaking of the semipermeable membrane for detachment of the foulant.

13. The method of claim 1, wherein the altering the NDP from negative to positive is performed without altering either the gauge pressure PGr or the gauge pressure PGp.

14. The method of claim 13, wherein the NDP equals PGr−PGp−POr+POp.

* * * * *

UNITED STATES PATENT AND TRADEMARK OFFICE
CERTIFICATE OF CORRECTION

| | | |
|---|---|---|
| PATENT NO. | : 12,157,091 B2 | Page 1 of 1 |
| APPLICATION NO. | : 17/589493 | |
| DATED | : December 3, 2024 | |
| INVENTOR(S) | : Boris Liberman and Igal Liberman | |

It is certified that error appears in the above-identified patent and that said Letters Patent is hereby corrected as shown below:

On the Title Page

Item (63), after "now Pat. No. 11,291,957" and before the ".", insert, therefor:
-- , which is a continuation of application No. 15/328,411, filed as application No. PCT/IB2015/055665 on Jul. 7, 2015, now Pat. No. 10,005,040 --

Signed and Sealed this
Eleventh Day of March, 2025

Coke Morgan Stewart
*Acting Director of the United States Patent and Trademark Office*